(12) United States Patent
Mitsuno et al.

(10) Patent No.: US 9,092,139 B2
(45) Date of Patent: Jul. 28, 2015

(54) MANAGEMENT APPARATUS AND MANAGEMENT METHOD USING COPY PAIR OF VIRTUAL VOLUMES

(75) Inventors: Takanori Mitsuno, Odawara (JP); Hiroshi Arakawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 336 days.

(21) Appl. No.: 13/575,141

(22) PCT Filed: Jul. 5, 2012

(86) PCT No.: PCT/JP2012/004392
§ 371 (c)(1),
(2), (4) Date: Jul. 25, 2012

(87) PCT Pub. No.: WO2014/006661
PCT Pub. Date: Jan. 9, 2014

(65) Prior Publication Data
US 2014/0013069 A1 Jan. 9, 2014

(51) Int. Cl.
*G06F 3/06* (2006.01)
(52) U.S. Cl.
CPC .............. *G06F 3/0605* (2013.01); *G06F 3/065* (2013.01); *G06F 3/0607* (2013.01); *G06F 3/067* (2013.01); *G06F 3/0647* (2013.01)
(58) Field of Classification Search
CPC ... G06F 3/0605; G06F 3/0607; G06F 3/0647; G06F 3/065; G06F 3/067; G06F 11/1464; G06F 11/1469; G06F 11/1474; G06F 11/1662; G06F 11/2094
USPC .......................................... 711/162, E12.103
See application file for complete search history.

(56) References Cited

U.S. PATENT DOCUMENTS

| | | | |
|---|---|---|---|
| 8,812,800 B2 * | 8/2014 | Usami ........................... | 711/162 |
| 2003/0131207 A1 * | 7/2003 | Arakawa et al. .............. | 711/162 |
| 2006/0085575 A1 * | 4/2006 | Hosouchi et al. .............. | 710/38 |
| 2006/0143418 A1 * | 6/2006 | Takahashi et al. ............ | 711/165 |
| 2006/0218366 A1 | 9/2006 | Fukuda et al. | |
| 2008/0244139 A1 * | 10/2008 | Nakajima ...................... | 710/300 |
| 2009/0276594 A1 * | 11/2009 | Fujii et al. ..................... | 711/162 |
| 2012/0011394 A1 | 1/2012 | Maki et al. | |
| 2012/0317319 A1 * | 12/2012 | Myrah et al. ................... | 710/74 |

FOREIGN PATENT DOCUMENTS

| | | |
|---|---|---|
| EP | 2 309 372 A2 | 4/2011 |
| JP | 2011-076128 A | 4/2011 |

OTHER PUBLICATIONS

PCT International Search Report on application PCT/JP2012/004392 mailed Nov. 3, 2013; 3 pages.

* cited by examiner

*Primary Examiner* — Mardochee Chery
(74) *Attorney, Agent, or Firm* — Foley & Lardner LLP

(57) ABSTRACT

A management apparatus and management method capable of simplifying system management and constructing copy pairs with fault tolerance intended by a user are suggested. With a computer system for providing a host system with logical volumes in the system respectively as virtual volumes in one virtual storage apparatus, each storage apparatus is grouped in accordance with a designated grouping policy and a group ID specific to a storage group, to which the relevant storage apparatus belongs, is assigned to each storage apparatus; and when setting a copy pair, a part or whole of each logical volume is switched to an appropriate logical volume as needed in accordance with a copy pair setting policy, including a location relationship of the respective logical volumes associated with the respective virtual volumes constituting the copy pair, based on the group ID of each storage apparatus.

6 Claims, 32 Drawing Sheets

FIG.6

| VIRTUAL VOLUME ID | CAPACITY | USED AMOUNT | STORAGE APPARATUS ID | VOLUME ID | GROUP ID |
|---|---|---|---|---|---|
| A | 10GB | 5GB | 110 | 410 | 1 |
| B | 10GB | 8GB | 1110 | 1410 | 1 |
| C | 10GB | 3GB | 2110 | 2410 | 2 |
| D | 10GB | 5GB | 2110 | 2330 | 2 |
| ... | ... | ... | ... | ... | ... |
| 40A | 40B | 40C | 40D | 40E | 40F |

| LOGICAL DEVICE ID | CAPACITY | USED AMOUNT | TYPE | PAGE ADDRESS | STATUS |
|---|---|---|---|---|---|
| 310 | 10GB | 1GB | THIN PRO-VISIONING | 0x00 | ALLOCATED |
| | | | | 0x01 | ALLOCATED |
| | | | | : | : |
| 320 | 10GB | 2GB | THIN PRO-VISIONING | 0x00 | ALLOCATED |
| | | | | 0x01 | ALLOCATED |
| | | | | : | : |
| 330 | 10GB | 2GB | THIN PRO-VISIONING | 0x00 | ALLOCATED |
| | | | | 0x01 | ALLOCATED |
| | | | | : | : |
| 340 | 10GB | 3GB | NORMAL | 0x00 | ALLOCATED |
| | | | | 0x01 | UNALLOCATED |
| : | : | : | : | : | : |
| 41A | 41B | 41C | 41D | 41E | 41F |

FIG.8

| POOL ID | ENTIRE CAPACITY | POOL PAGE ADDRESS | STATUS | CONSTITUENT LOGICAL DEVICES | PAGE ADDRESS | ALLOCATED -LOCATION LOGICAL VOLUME |
|---|---|---|---|---|---|---|
| POOL300 | 30GB | 0x00 | ALLOCATED | 310 | 0x00 | 410 |
| | | 0x01 | ALLOCATED | | 0x01 | 420 |
| | | 0x02 | UNALLOCATED | | 0x02 | – |
| | | : | : | | : | : |
| | | 1x00 | ALLOCATED | 320 | 0x00 | 410 |
| | | 1x01 | ALLOCATED | | 0x01 | 410 |
| | | 1x02 | UNALLOCATED | | 0x02 | – |
| | | : | : | | : | : |
| | | 2x00 | ALLOCATED | 330 | 0x00 | 410 |
| | | 2x01 | ALLOCATED | | 0x01 | 410 |
| | | 2x02 | UNALLOCATED | | 0x02 | – |
| | | : | : | | : | : |
| 42A | 42B | 42C | 42D | 42E | 42F | 42G |

| VOLUME ID | ADDRESS | STATUS | POOL PAGE ADDRESS | LOGICAL DEVICE ID | PAGE ADDRESS |
|---|---|---|---|---|---|
| 410 | 0x00 | ALLOCATED | 0x00 | 310 | 0x00 |
| | 0x01 | ALLOCATED | 1x00 | 320 | 0x00 |
| | 0x02 | ALLOCATED | 2x00 | 330 | 0x00 |
| | 0x03 | ALLOCATED | 1x01 | 320 | 0x01 |
| | : | : | : | : | : |
| 420 | 0x00 | ALLOCATED | 0x01 | 310 | 0x01 |
| | 0x01 | UNALLOCATED | — | — | — |
| | 0x02 | UNALLOCATED | — | — | — |
| | : | : | : | : | : |
| 430 | 0x00 | UNALLOCATED | — | — | — |
| | 0x01 | UNALLOCATED | — | — | — |
| | 0x02 | UNALLOCATED | — | — | — |
| | : | : | : | : | : |
| : | : | : | : | : | : |
| 43A | 43B | 43C | 43D | 43E | 43F |

| APPARATUS ID | TOTAL CAPACITY | CAPACITY THRESHOLD | USED AMOUNT | MEDIA ID | MEDIA TYPE | RAID CONFIGU-RATION | CAPACITY | USED AMOUNT |
|---|---|---|---|---|---|---|---|---|
| 110 | 14100GB | 60% | 6130GB | 340 | SSD | 4D+1P | 100GB | 30GB |
| | | | | 350 | SAS | 4D+1P | 2000GB | 100GB |
| | | | | 360 | SATA | 4D+1P | 4000GB | 2000GB |
| | | | | 370 | SATA | 6D+2P | 8000GB | 4000GB |
| | | | | ⋮ | ⋮ | ⋮ | ⋮ | ⋮ |

| PAIR ID | PRIMARY LOGICAL VOLUME ||  SECONDARY LOGICAL VOLUME ||
|---|---|---|---|---|
| | STORAGE APPARATUS ID | VOLUME ID | STORAGE APPARATUS ID | VOLUME ID |
| 1 | 1 | 1 | 2 | 1 |
| 2 | 1 | 2 | 3 | 1 |
| 3 | 2 | 2 | 3 | 2 |
| .. | .. | .. | .. | .. |

FIG.12

| APPARATUS NUMBER | VENDOR NAME | TYPE NAME | PRODUCTION NUMBER | DEFAULT VIRTUAL VENDOR NAME | DEFAULT VIRTUAL TYPE NAME | DEFAULT VIRTUAL PRODUCTION NUMBER | MANAGEMENT COMMUNICATION I/F ADDRESS | GROUP ID |
|---|---|---|---|---|---|---|---|---|
| 1 | WXYZ | STORAGE1 | 101 | XWYZ | VSTORAGE10 | 1000 | 192.168.1.200 | 1 |
| 2 | WXYZ | STORAGE2 | 201 | XWYZ | VSTORAGE10 | 1000 | 192.168.1.201 | 1 |
| 3 | WXYZ | STORAGE3 | 301 | XWYZ | VSTORAGE10 | 1000 | 192.168.2.200 | 2 |
| 46A | 46B | 46C | 46D | 46E | 46F | 46G | 46H | 46I |

| GROUP ID | APPARATUS ID |
|---|---|
| 1 | 1 |
| | 2 |
| 2 | 3 |

47A 47B 47

MANAGEMENT APPARATUS AND MANAGEMENT METHOD USING COPY PAIR OF VIRTUAL VOLUMES

TECHNICAL FIELD

The present invention relates to a management apparatus and management method. Particularly, the invention is suited for use in a management apparatus for managing an entire computer system.

BACKGROUND ART

Recently, a virtualization technique that integrates and manages logical volumes in each storage apparatus installed at each of a plurality of sites and logical volumes under control of different storage apparatuses and provides a host system with the logical volumes as virtual logical volumes (hereinafter referred to as the virtual volumes) existing under control of one virtual storage apparatus (hereinafter referred to as the virtual storage apparatus) has been suggested and put to practical use.

Such a virtualization technique assigns a unique virtual apparatus number to each storage apparatus in a computer system and maps each logical volume existing in each storage apparatus to any of virtual volumes existing in the virtual storage apparatus. Then, only the virtual storage apparatus and virtual volumes provided by the virtual storage apparatus are provided to the host system.

The above-described virtualization technique has the advantage that a system administrator can manage the logical volumes in the computer system without recognizing the storage apparatuses in the computer system or the logical volumes defined in the storage apparatuses.

On the other hand, data backups using a replication copying (real-time copying) technique have been widely employed in recent years particularly in computer systems of large-scale companies and governments in order to protect data against large-scale natural disasters such as earthquakes or hurricanes, human-caused disasters such as disasters caused by erroneous operations by the system administrator or terrorism attacks, and data destruction caused by failures of equipment and programs.

Examples of such replication copying include local copying, snapshots, and remote copying. Local copying is data copying within the same storage apparatus and remote copying is data copying between storage apparatuses. Furthermore, snapshots are static data images of logical volumes at the time of acquisition of the snapshots. When a snapshot is obtained in a storage apparatus, to which the snapshot technique is applied, and data is then written to the relevant logical volume, data immediately before that write data is written (data at the time of snapshot acquisition) is saved to another logical volume. Therefore, the logical volume at the time of snapshot acquisition can be restored by combining the data at the time of snapshot acquisition remaining in that logical volume and the data saved to another logical volume.

CITATION LIST

Patent Literature

PTL 1: Japanese Patent Application Laid-Open (Kokai) Publication No. 2011-076128

SUMMARY OF INVENTION

Technical Problem

However, the above-described conventional virtualization technique has a problem, when creating a copy pair for replication copying between virtual volumes, of the difficulty in recognizing which logical volume in which storage apparatus installed at which site is mapped to which virtual volume.

As a result, a problem occurs such that a copy pair which cannot satisfy fault tolerance expected by the user is set as in a case where, for example, even if the user thinks that he defined a copy pair of remote copying between virtual volumes, these virtual volumes are associated with logical volumes existing in the same storage apparatus.

Incidentally, PTL 1 suggests a management method for managing replications in consideration of clustering in association with replication copying. However, PTL 1 discloses nothing about how to solve problems like the above-described problem relating to the virtualization technique.

The present invention was devised in consideration of the above-described circumstances and aims at suggesting a management apparatus and management method capable of simplifying system management and constructing copy pairs with fault tolerance intended by a user.

Solution to Problem

In order to solve the above-described problem, a management apparatus for managing a computer system for providing a host system with logical volumes, which are created respectively in a plurality of storage apparatuses, as virtual volumes in one virtual storage apparatus is provided according to the present invention, wherein the management apparatus includes: a storage apparatus grouping unit for grouping the respective storage apparatuses constituting the virtual storage apparatus into a plurality of storage groups in accordance with a designated grouping policy and assigning a group ID specific to the storage group, to which the relevant storage apparatus belongs, to each storage apparatus; and a copy pair setting unit used when setting a copy pair, for switching a part or whole of each of the logical volumes, which are associated with the respective virtual volumes designated as a copy source and a copy designation of the copy pair, to an appropriate logical volume as necessary based on the group ID assigned to each storage apparatus and in accordance with a designated copy pair setting policy, wherein the copy pair setting policy includes a location relationship of the respective logical volumes associated with the respective virtual volumes designated as the copy source and the copy destination.

Furthermore, a management method by a management apparatus for managing a computer system for providing a host system with logical volumes, which are created respectively in a plurality of storage apparatuses, as virtual volumes in one virtual storage apparatus is provided according to the present invention, wherein the management method includes: a first step executed by the management apparatus of grouping the respective storage apparatuses constituting the virtual storage apparatus into a plurality of storage groups in accordance with a designated grouping policy and assigning a group ID specific to the storage group, to which the relevant storage apparatus belongs, to each storage apparatus; and a second step executed by the management apparatus when setting a copy pair, a copy pair setting unit used when of switching a part or whole of each of the logical volumes, which are associated with the respective virtual volumes designated as a copy source and a copy designation of the copy pair, to an appropriate logical volume as necessary based on the group ID assigned to each storage apparatus and in accordance with a designated copy pair setting policy, wherein the copy pair setting policy includes a location relationship of the respective logical volumes associated with the respective virtual volumes designated as the copy source and the copy destination.

When the above-described management apparatus and management method are used and if the location relationship of the respective logical volumes associated with the copy source virtual volume and the copy destination virtual volume is not appropriate, at least one of the logical volumes associated with the copy source virtual volume and the copy destination virtual volume is switched to an appropriate logical volume. So, the system administrator can create a copy pair with the fault tolerance intended by the system administrator without recognizing the location relationship of the respective logical volumes associated with the copy source virtual volume and the copy destination virtual volume.

Advantageous Effects of Invention

According to the present invention, system management can be simplified and copy pairs with the fault tolerance intended by the user can be constructed.

BRIEF DESCRIPTION OF DRAWINGS

FIG. 6 is a conceptual diagram showing the structure of a virtual volume management table.
FIG. 7 is a conceptual diagram showing the structure of a logical device management table.
FIG. 8 is a conceptual diagram showing the structure of a pool management table.
FIG. 9 is a conceptual diagram showing the structure of a logical volume management table.
FIG. 10 is a conceptual diagram showing the structure of a storage apparatus usage management table.
FIG. 11 is a conceptual diagram showing the structure of a copy pair management table.
FIG. 12 is a conceptual diagram showing the structure of a storage apparatus management table.
FIG. 13 is a conceptual diagram showing the structure of a group ID reverse lookup table.

DESCRIPTION OF EMBODIMENTS

One embodiment of the present invention will be explained below in detail with reference to the attached drawings.

(1) Configuration of Computer System According to this Embodiment

Figure 1:
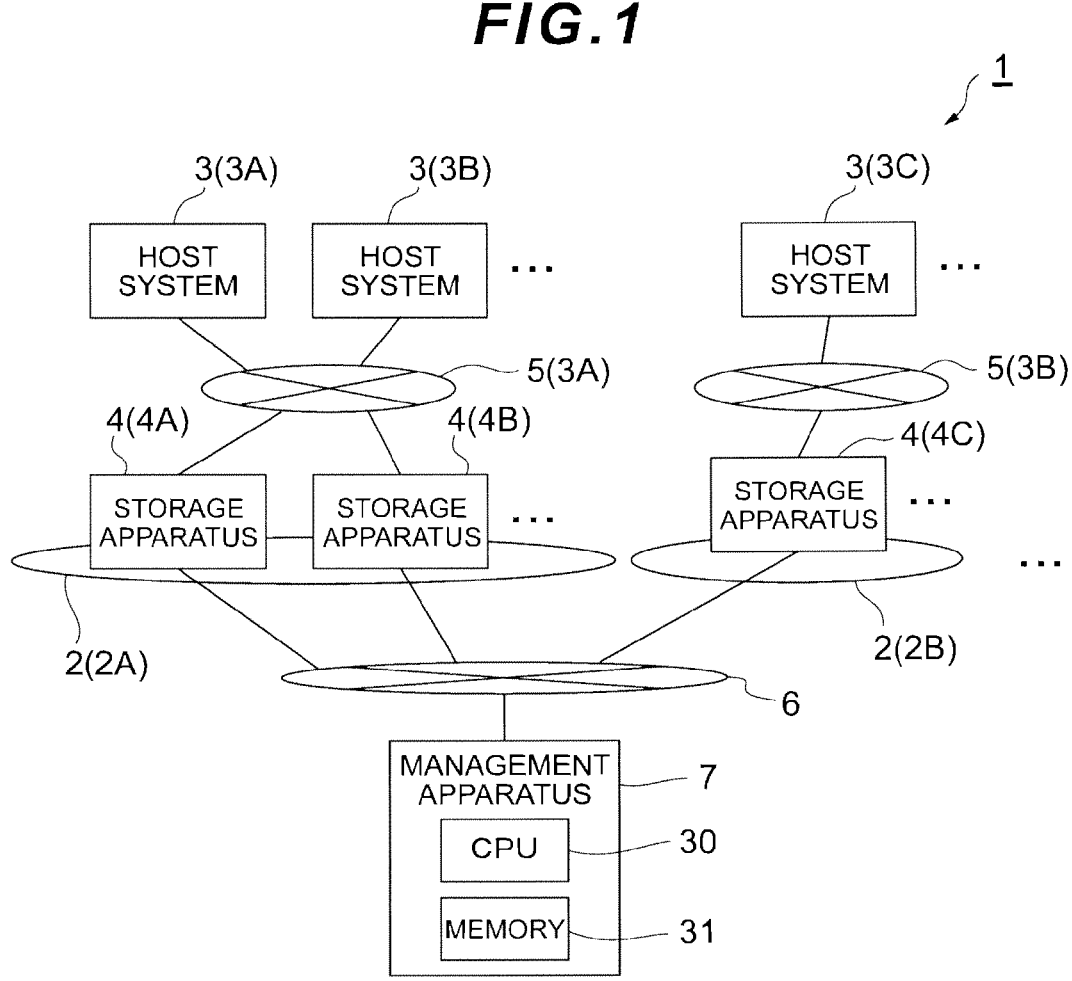
FIG. 1 is a block diagram showing the overall configuration of a computer system according to this embodiment.

Referring to FIG. 1, the reference numeral 1 represents a computer system according to this embodiment as a whole. This computer system 1 includes a plurality of sites 2 (2A, 2B, and so on); and one or more host systems 3 (3A, 3B, 3C, and so on) and one or more storage apparatuses 4 (4A, 4B, 4C, and so on) are installed at each of these sites 2. Furthermore, the host system(s) 3 and the storage apparatus(es) 4 at the same site 2 are mutually connected via a first network 5 (5A, 5B, and so on) composed of, for example, a SAN (Storage Area Network) and each of the storage apparatus(es) 4 at each site 2 is connected to a management apparatus 7 via a second network 6 composed of, for example, a LAN (Local Area Network).

The host system 3 is a computer system that issues I/O commands (read commands or write commands) to the storage apparatus(es) 4 and control commands for the storage apparatus(es) 4; and is composed of, for example, a personal computer, workstation, or mainframe.

Figure 2:
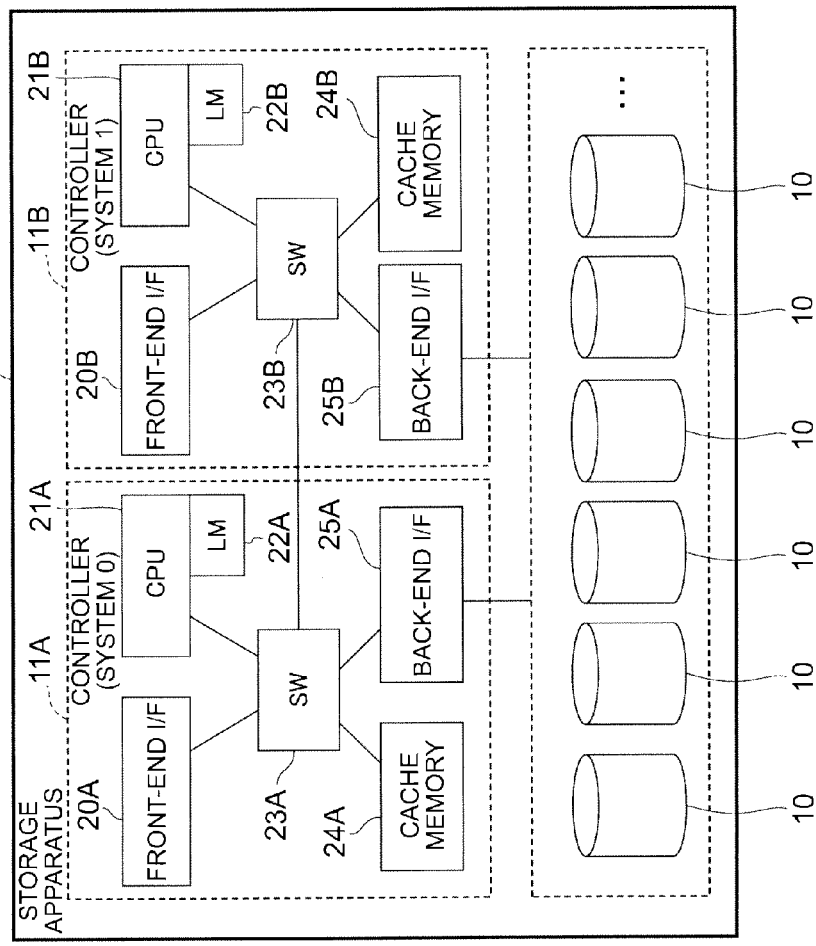
FIG. 2 is a block diagram showing a schematic configuration of a storage apparatus.

The storage apparatus 4 is configured by including a plurality of storage devices 10 and two controllers 11A, 11B of system 0 and system 1 for controlling data input to and/or output from the plurality of storage devices 10 as shown in FIG. 2.

The storage devices 10 are composed of, for example, hard disk drives such as SAS (Serial Attached SCSI) disks or SATA (Serial AT Attachment) disks, semiconductor memories such as SSDs (Solid State Drives), flash memory devices, or optical disks. These storage devices 10 are operated by each controller 11A, 11B of system 0 and system 1 according to a RAID (Redundant Arrays of Inexpensive Disks) system. Incidentally, there may be one controller 11A, 11B.

Each of the system-0 controller 11A and the system-1 controller 11B includes a front-end interface unit 20A, 20B, a CPU (Central Processing Unit) 21A, 21B, a local memory 22A, 22B, a switch unit 23A, 23B, a cache memory 24A, 24B, and a back-end interface unit 25A, 25B.

The front-end interface unit 20A, 20B is an interface with the first and second networks 5, 6, sends/receives data (write data or read data) and I/O commands to/from the host system 3 via the first network 5, sends/receives data to/from the storage apparatus(es) 4 installed at another site via the second network 6, and sends/receives various management information and commands to/from the management apparatus 7.

The CPU 21A, 21B is a processor for controlling the operation of the entire storage apparatus 4 and, for example, controls input/output of data, commands, or management information which are sent/received via the front-end interface unit 20A, 20B. Furthermore, the local memory 22A, 22B is mainly used to retain various control programs and various control data. Various processing as described later is executed in the storage apparatus 4 as a whole by the CPU 21A, 21B executing the control programs retained in the memory 22A, 22B.

The switch unit 23A, 23B has a function that switches a data transfer source and a data transfer destination between the front-end interface units 20A, 20B, the CPUs 21A, 21B, the cache memories 24A, 24B, and the back-end interface units 25A, 25B and is composed of, for example, a PCIe (PCI [peripheral component interconnect] Express) switch.

Furthermore, the switch unit 23A, 23B is connected with the switch unit 23B, 23A of the other system (system 0 or system 1) via a bus 26 and is designed to be capable of sending/receiving commands and/or data to/from the switch unit 23B, 23A of the other system via this bus 26.

The cache memory 24A, 24B is mainly used to temporarily store data transferred between the front-end interface units 20A, 20B and the back-end interface units 25A, 25B.

The back-end interface unit 25A, 25B in an interface with the storage devices 10. The CPU 21A, 21B reads and/or writes write data or read data from and/or to a corresponding address location in a corresponding storage device 10 by controlling the corresponding storage device 10 via the back-end interface unit 25A, 25B based on an I/O command which is given from the host system 3 via the front-end interface unit 20A, 20B.

The management apparatus 7 is a server apparatus for managing the entire computer system 1 and is configured by including information processing resources such as a CPU 30 and a memory 31 as shown in FIG. 1. The CPU 30 is a processor for controlling the operations of the entire management apparatus 7. Furthermore, the memory 31 is used as a work memory for the CPU 30 and is also used to store and retain various control programs and necessary data. As the CPU 30 executes the various control programs stored in the memory 31, various screens described later are displayed on the management apparatus 7 and the management apparatus 7 as a whole executes various processing described later. This management apparatus 7 is connected to each storage apparatus 4 via the second network 6, collects necessary information from the storage apparatuses 4 via this second network 6, and makes various settings to the storage apparatuses 4.

Figure 3:
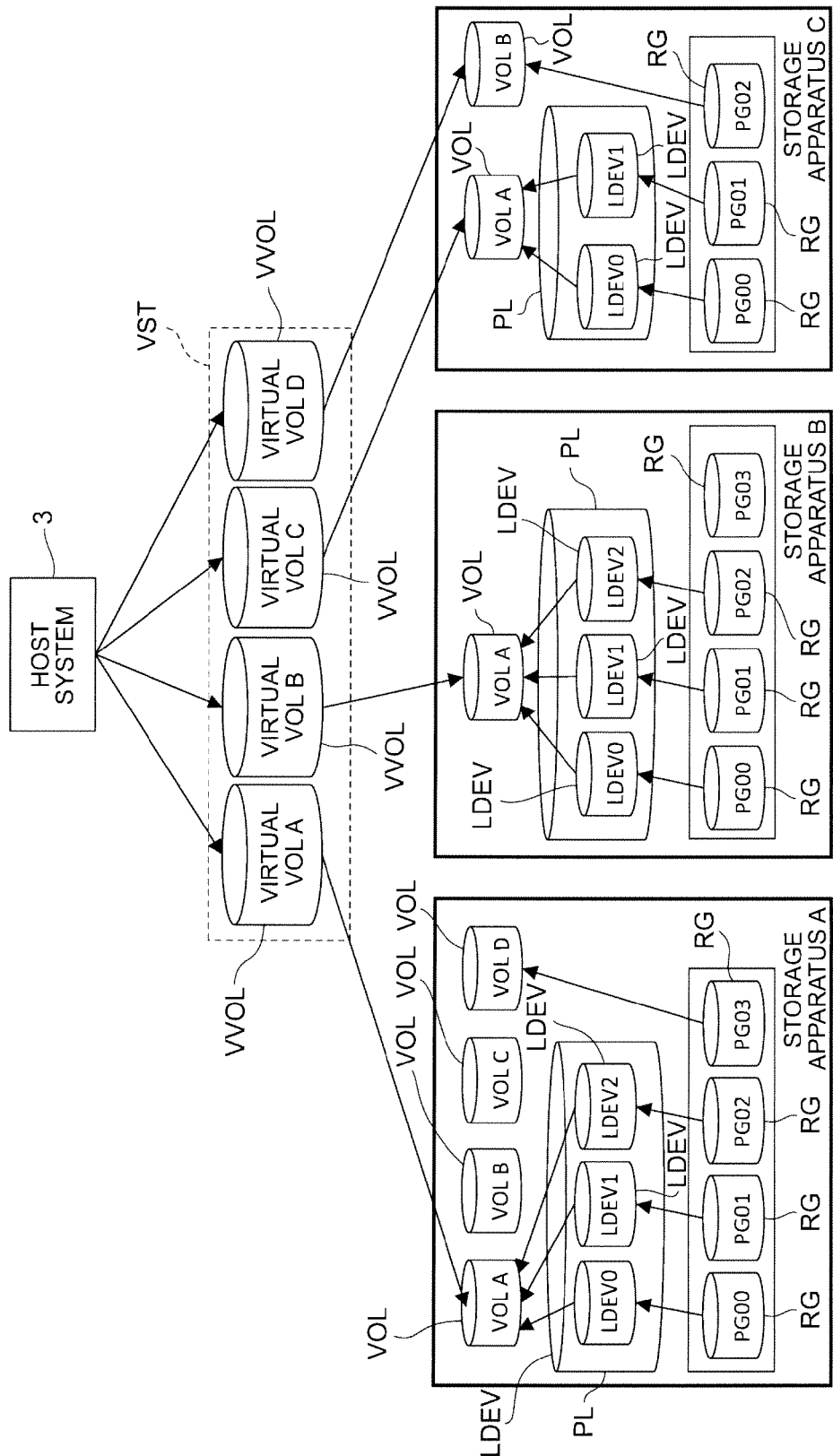
FIG. 3 is a conceptual diagram for explaining a logical structure of storage areas in the computer system according to this embodiment.

FIG. 3 shows a logical structure of storage areas in the computer system 1. In a case of this computer system 1, one or more storage devices 10 in the storage apparatus 4 constitutes one RAID group RG and one or more logical devices LDEVs are set in a physical storage area(s) provided by each storage device 10 constituting one RAID group RG.

Furthermore, one or more logical devices LDEVs constitute one pool PL and one or more logical devices LDEVs constituting the same pool PL constitute one logical volume VOL. Incidentally, storage areas provided by RAID groups RGs may sometimes be directly defined as logical volumes VOLs (such as "VOL D" of a storage apparatus A and "VOL B" of a storage apparatus B in FIG. 3). Then, data from the host system 3 is stored in units of a specified sized storage area (hereinafter referred to as the page(s)) in this logical volume VOL.

Each logical volume VOL is assigned a unique identifier (hereinafter referred to as the volume ID). In a case of this embodiment, data is input/output by designating an address which is a combination of this volume ID and a number assigned to each page and specific to the relevant page (hereinafter referred to as the page address).

On the other hand, each storage apparatus 4 in this computer system 1 is assigned an identifier for a common virtual storage apparatus VST (FIG. 3) (hereinafter referred to as the virtual apparatus ID). Then, when each storage apparatus 4 receives an inquiry command from the host system 3, the virtual apparatus ID is reported as an identifier of the relevant local storage apparatus (hereinafter referred to as the apparatus ID). As a result, the host system 3 recognizes all the storage apparatuses 4 in this computer system 1 as one virtual storage apparatus VST.

Furthermore, the host system 3 is provided with virtual volumes VVOL, each of which is assigned a unique identifier (hereinafter referred to as the virtual volume ID) as a logical volume in the virtual storage apparatus VST, under control of the management apparatus 7. Any of the logical volumes VOL in any of the storage apparatuses 4 is mapped to each of those virtual volumes VVOL.

The management apparatus 7 and each of all the storage apparatuses 4 constituting the virtual storage apparatus VST manage which logical volume VOL in which storage apparatus 4 is mapped to which virtual volume VVOL, by using the virtual volume management table 40 shown in FIG. 6.

This virtual volume management table 40 is constructed from a virtual volume ID column 40A, a capacity column 40B, a used amount column 40C, a storage apparatus ID column 40D, a logical device ID column 40E, and a group ID column 40F as shown in FIG. 6.

Then, the virtual volume ID column 40A stores an identifier specific to each virtual volume VVOL defined in the virtual storage apparatus VST (hereinafter referred to as the virtual volume ID). Moreover, the capacity column 40B stores the capacity of the corresponding virtual volume VVOL and the used amount column 40C stores a current used amount of the relevant virtual volume VVOL.

Furthermore, the volume ID column 40E stores a volume ID of a logical volume VOL associated with the relevant virtual volume VVOL and the storage apparatus ID column 40D stores the identifier of a storage apparatus 4 in which the logical volume VOL associated with the relevant virtual volume VVOL is created (hereinafter referred to as the apparatus ID). Furthermore, the group ID column 40F stores the identifier assigned to a storage group to which the relevant storage apparatus 4 belongs (hereinafter referred to as the group ID). Incidentally, the details of the group ID will be explained later.

Accordingly, in the case of FIG. 6, it is shown that regarding a virtual logical volume VVOL whose virtual volume ID is "A," its capacity is "10 GB," its current used amount is "5 GB," and it is associated with a logical volume which is assigned the volume ID "410" in a storage apparatus 4 with the apparatus ID "110" belonging to a storage group with the group ID "1."

Then, when reading/writing data from/to the virtual storage apparatus VST, the host system 3 sends an I/O command, which designates a read-location or write-location virtual volume VVOL, to the storage apparatus 4 connected to the host system itself.

After receiving the I/O command, the storage apparatus 4 refers to the virtual volume management table 40 and judges in which storage apparatus 4 the logical volume VOL mapped to the virtual volume VVOL designated as the read location or the write location in the relevant I/O command exists.

Then, when the storage apparatus 4 determines that the relevant logical volume VOL exists in that local storage apparatus, it refers to a management table (not shown in the drawing) in which the correspondence relationship between each page of the virtual volume VVOL and each page of the logical volume VOL mapped to the relevant virtual volume VVOL is registered, converts a page address of the write location or the read location designated in the I/O command to a page address in the relevant logical volume VOL, and executes I/O processing on the relevant page address in the relevant logical volume VOL. Furthermore, if the storage apparatus 4 determines that the relevant logical volume VOL exists in another storage apparatus 4, it externally connects the relevant logical volume VOL to the local storage apparatus by means of an external connection function and then executes I/O processing on the relevant logical volume VOL in accordance with the I/O command.

Incidentally, the external connection function is a function that virtualizes a logical volume VOL in another storage apparatus 4 and provides it to the host system 3; and when an I/O command targeted at the relevant logical volume VOL is given from the host system 3, the external connection function reads/writes data from/to the relevant logical volume VOL by transferring the I/O command to the relevant other storage apparatus 4.

(2) Storage Apparatus Grouping Function and Copy Pair Setting Function

Next, a storage apparatus grouping function and copy pair setting function that are installed on the computer system 1 will be explained.

The computer system 1 according to this embodiment is equipped with the storage apparatus grouping function that groups a plurality of storage apparatuses 4 constituting a virtual storage apparatus VST into a plurality of groups (hereinafter referred to as the storage groups) in accordance with a first policy designated by a user such as a system administrator (hereinafter referred to as the grouping policy) and assigns an identifier (group ID), which is specific to the relevant storage group, to all the storage apparatuses 4 in the same storage group.

Furthermore, the computer system 1 is also equipped with a copy pair setting function that switches a primary logical volume VOL or a secondary logical volume VOL to another appropriate logical volume VOL as necessary in accordance with a second policy (hereinafter referred to as the copy pair setting policy) including the group ID, which was assigned to each storage apparatus 4 when setting a copy pair of virtual volumes, the copy type of replication copying ("Local Copy," "Snapshot," or "Remote Copy") to be executed by the copy pair which is to be created at that time, and the location relationship, which is designated by the user, between the primary logical volume VOL and the secondary logical volume VOL ("Same Apparatus," "Same Group," "Another Group," and "Plurality of Other Groups"), so that the other appropriate logical volume VOL would satisfy that copy pair setting policy.

Now, in the case of this computer system 1, a first grouping policy to group the storage apparatuses 4 based on product information such as a vendor name and a type name, a second grouping policy to group the storage apparatuses 4 based on access information retained by each storage apparatus 4 about access from the host system 3, a third grouping policy to group the storage apparatuses 4 based on network information retained by network equipment constituting the first network 5 for connecting the host system 3 and the storage apparatuses 4, and a fourth grouping policy for the system administrator to manually group the storage apparatuses are specified as the aforementioned grouping policy.

According to the first grouping policy among the above-described policies, the storage apparatuses can be grouped by product performance. Moreover, the second grouping policy is based on the fact that the storage apparatuses 4 installed at the same site 2 are frequently accessed from the same host system 3; and the storage apparatuses 4 installed at the same site 2 can be grouped into the same storage group by applying this second grouping policy. Furthermore, according to the third grouping policy, the storage apparatuses 4 installed respectively at physically close one or more sites 2, which are managed as one zone by the network equipment such as a network switch constituting the first network 5, can be grouped into the same storage group. Furthermore, according to the fourth grouping policy, the system administrator can freely set a desired storage group(s).

Then, the system administrator can set one desired grouping policy as the grouping policy in advance from among the aforementioned first to fourth grouping policies by operating the management apparatus 7.

Figure 4:
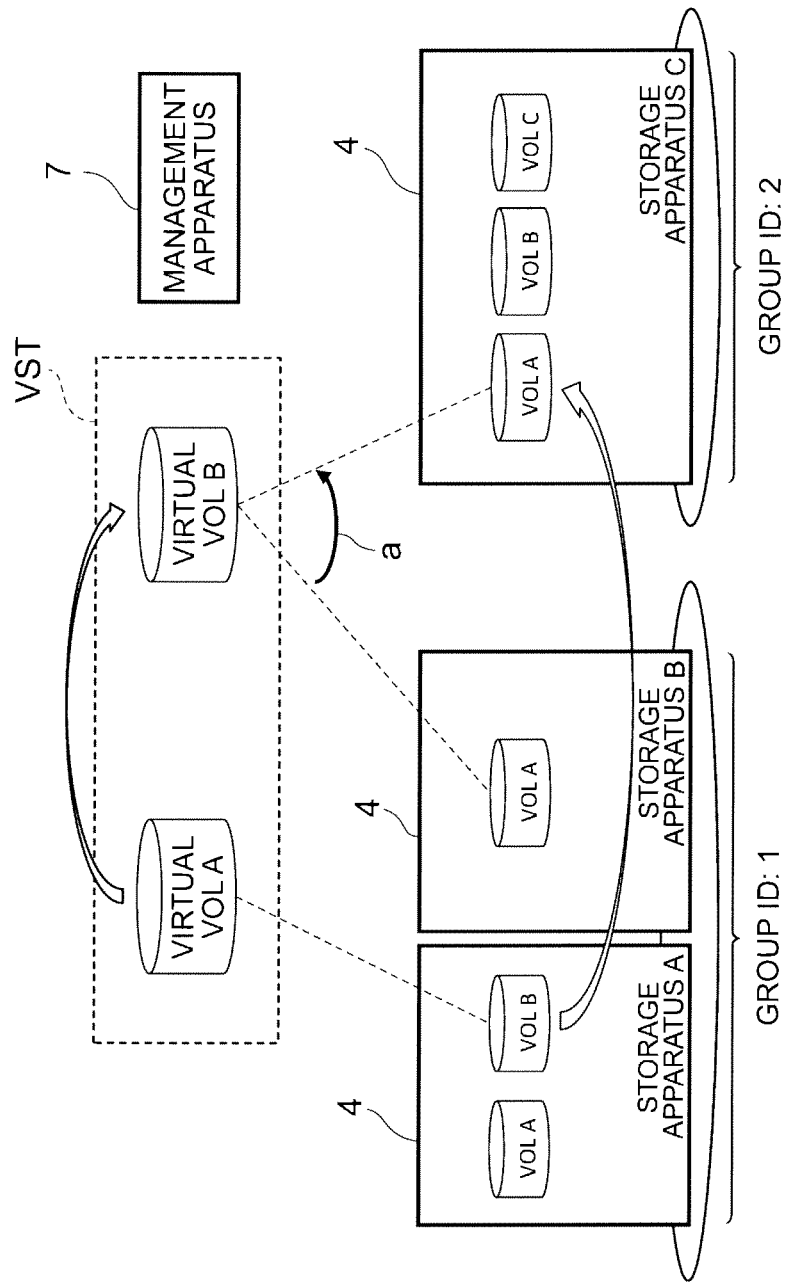
FIG. 4 is a conceptual diagram for explaining the outline of a storage apparatus grouping function and a copy pair setting function according to this embodiment.

Thus, when a command to execute grouping of the respective storage apparatuses 4 constituting the virtual storage apparatus VST is input, the management apparatus 7 groups the storage apparatuses 4 in the computer system 1 in accordance with the grouping policy then designated from among the aforementioned first to fourth grouping policies and assigns the group ID of a storage group, to which the relevant storage apparatus 4 belongs, to each storage apparatus 4 as shown in FIG. 4.

Subsequently, when a primary virtual volume VVOL and a secondary virtual volume VVOL to constitute a copy pair, and a desired copy pair setting policy including the location relationship between the primary logical volume VOL and the secondary logical volume VOL are designated and a command to create the copy pair is input, the management apparatus 7 judges whether the current location relationship between the primary logical volume VOL and the secondary logical volume VOL matches the relevant copy pair setting policy or not; and if the current location relationship between the primary logical volume VOL and the secondary logical volume VOL does not match the relevant copy pair setting policy, the management apparatus 7 switches a part or whole of the primary logical volume VOL and the secondary logical volume VOL to another logical volume AVOL that satisfies the copy pair setting policy (arrow a).

Accordingly, the computer system 1 according to this embodiment is designed to be capable of creating a copy pair of the primary virtual volume VVOL and the secondary virtual volume VVOL, which have fault tolerance intended by the system administrator, without recognizing the primary logical volume VOL and the secondary logical volume VOL.

Figure 5:
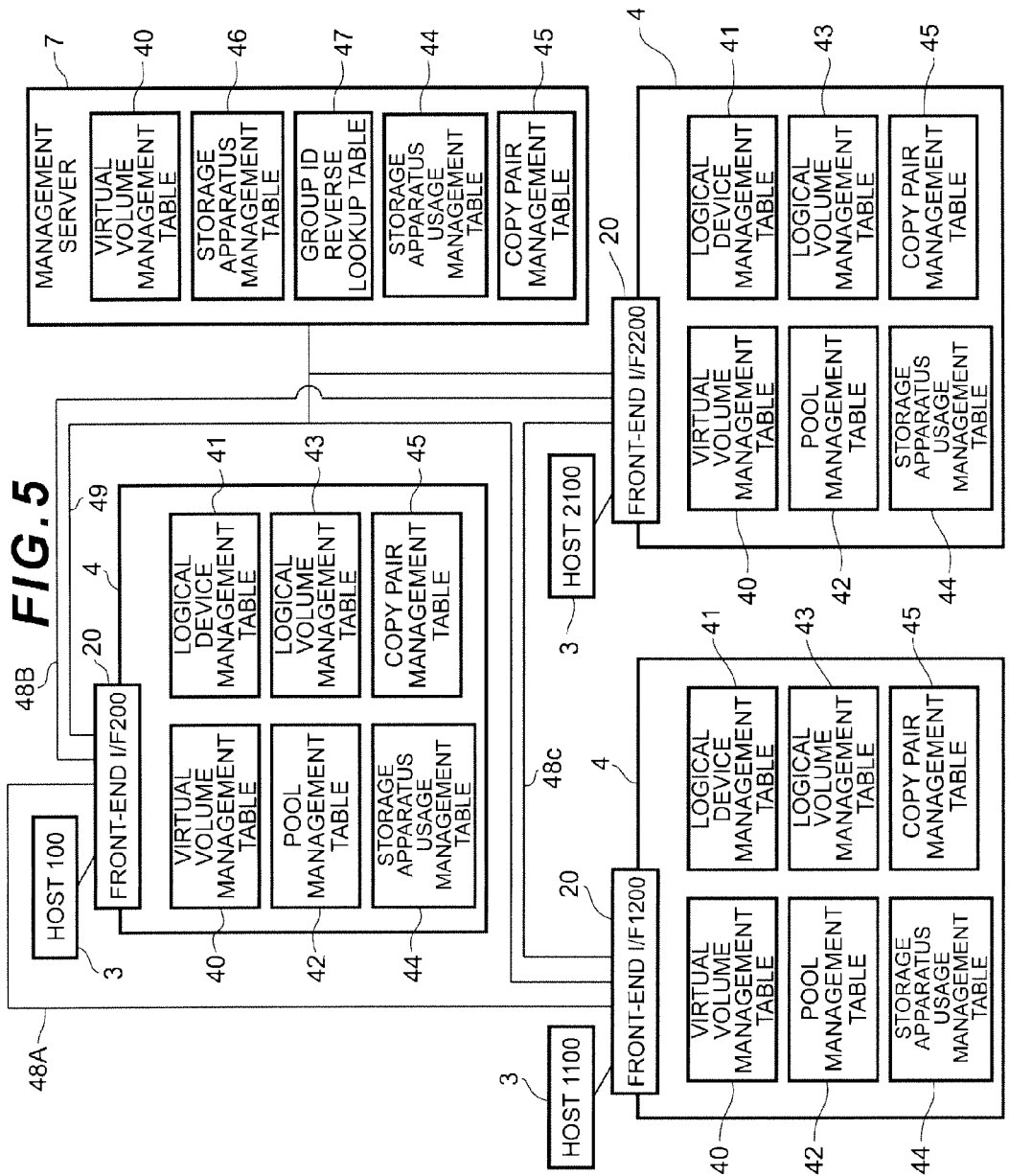
FIG. 5 is a conceptual diagram for explaining tables retained by each storage apparatus and a management apparatus in the computer system according to this embodiment.

As the means for realizing the storage apparatus grouping function and the copy pair setting function according to this embodiment as described above, the local memory 22A, 22B (FIG. 2) for each storage apparatus 4 in the computer system 1 stores, in addition to the aforementioned virtual volume management table 40, a logical device management table 41, a pool management table 42, a logical volume management table 43, a storage apparatus usage management table 44, and a copy pair management table 45; and the memory 31 (FIG. 1) for the management apparatus 7 stores, in addition to the virtual volume management table 40, a storage apparatus management table 46, a group ID reverse lookup table 47, the storage apparatus usage management table 44, and the copy pair management table 45 as shown in FIG. 5. Incidentally, the reference numerals 48A to 48C in FIG. 5 represent logical external connection paths constructed from, for example, the first network 5 and the reference numeral 49 represents a management path constructed from, for example, the second network 6.

Among the above-listed tables, the logical device management table 41 is a table used to manage logical devices LDEVs created by each storage apparatus 4 in that local storage apparatus (including logical volumes VOL directly created from a RAID group RG without the intermediary of a pool PL) and is constructed from a logical device ID column 41A, a capacity column 41B, a used amount column 41C, a type column 41D, a page address column 41E, and a status column 41F as shown in FIG. 7.

Then, the logical device ID column 41A stores a unique identification number (logical device ID) assigned to each logical device LDEV which is set in the relevant storage apparatus 4 and the capacity column 41B stores the capacity of the conesponding logical device LDVE. Moreover, the used amount column 41C stores the current used amount of the relevant logical device LDEV and the type column 41D stores the type of the relevant logical device LDEV. Incidentally, in the case of this embodiment, the types of the logical device LDEV include "Thin Provisioning" where the relevant logical device LDEV is associated with a virtual volume VVOL via a logical volume VOL, and "Normal" where the relevant logical device LDEV is used as a normal logical volume VOL as it is.

Furthermore, the page address column 41E stores the address of each page in the corresponding logical device LDEV and the status column 41F stores information indicating whether the corresponding page in the corresponding logical device LDEV is used or not (information indicating whether or not the page is allocated to a logical volume if the type of the logical device LDEV is "Thin Provisioning"; or information indicating whether data is stored or not if the type is "Normal"). Specifically speaking, if the corresponding page is used, the status column 41F stores "Allocated"; and if the corresponding page is not used, the status column 41F stores "Unallocated."

Therefore, in the case of FIG. 7, it is shown that, for example, regarding a logical device LDEV whose logical device ID is "310," "1 GB" of its capacity "10 GB" is used, its type is "Thin Provisioning," and a page of the relevant logical device LDEV whose page address is "0x00" is already allocated to any of logical volumes VOL.

The pool management table 42 is a table used to manage pools PL created by each storage apparatus 4 in that local storage apparatus and is constructed from a pool ID column 42A, an entire capacity column 42B, a pool page address column 42C, a status column 42D, a constituent logical device column 42E, a page address column 43F, and an allocated-location logical volume column 43G as shown in FIG. 8.

Then, the pool ID column 42A stores the identifier (pool ID) of each pool PL created in the storage apparatus 4 and the entire capacity column 42B stores the capacity of the corresponding entire pool PL. Moreover, the pool page address column 42C stores the address of each page in the relevant pool PL (hereinafter referred to as the pool page) (hereinafter referred to as the pool page address) and the status column 42D stores information indicating whether or not data is already stored in the corresponding pool page in the pool PL. Specifically speaking, "Allocated" is stored in the status column 42D for a pool page where data is stored; and "Unallocated" is stored in the status column 42D for a pool page where data is not stored.

Furthermore, the constituent logical device column 42E stores logical device IDs of all logical devices LDEVs constituting the relevant pool PL and the page address column 42F stores the addresses of pages in the corresponding logical devices LDEV constituting the corresponding pool pages. Furthermore, the allocated-location logical volume column 42G stores the volume ID of a logical volume VOL to (or with) which the corresponding page in the corresponding logical device LDEV is allocated (or associated).

Accordingly, FIG. 8 shows that the entire capacity of a pool PL "POOL300" is "30 GB," a pool page whose pool page address in that pool PL is "0x00" is constituted from a page whose page address is "0x00" in a logical device LDEV whose logical device ID is "310," and that page is already allocated ("Allocated") to a logical volume VOL whose volume ID is "410."

The logical volume management table 43 is a table used by each storage apparatus 4 to manage logical volumes VOLs created in that local storage apparatus and is constructed from a volume ID column 43A, an address column 43B, a status column 43C, a pool page address column 43D, a logical device ID column 43E, and a page address column 43F as shown in FIG. 9.

Then, the volume ID column 43A stores the volume ID of the corresponding logical volume VOL and the address column 43B stores the address of each page in the relevant logical volume VOL. Moreover, the status column 43C stores information indicating whether the corresponding page is already allocated to a virtual volume VVOL or not (whether data is already stored in the corresponding page or not). Specifically speaking, the status column 43C stores "Allocated" if the corresponding page is already allocated to a virtual volume VVOL; or the status column 43C stores "Unallocated" if the corresponding page is not allocated to a virtual volume VVOL.

Furthermore, the pool page address column 43D stores the pool page address in the corresponding pool PL associated with the corresponding page in the corresponding logical volume VOL and the logical device ID column 43E stores the corresponding page address in a logical device LDEV associated with the relevant pool page.

Therefore, in the case of FIG. 9, it is shown that a page with the page address "0x00" in a logical volume VOL with the volume ID "410" is already allocated to a virtual volume VVOL ("Allocated"). Moreover, it is shown that this page is associated with a pool page with the pool page address "0x00" in the corresponding pool PL and the relevant pool page is associated with a page with the page address "0x00" in a logical device LDEV with the logical device ID "310."

The storage apparatus usage management table 44 is retained by each of the storage apparatuses 4 and the management apparatus 7. In the case of the storage apparatus 4, the storage apparatus usage management table 44 is used to manage storage resources in the local storage apparatus; and in the case of the management apparatus 7, the storage apparatus usage management table 44 is used to manage storage resources in each storage apparatus 4. The management apparatus 7 retains the storage apparatus usage management table 44 for each storage apparatus 4.

This storage apparatus usage management table 44 is constructed from an apparatus ID column 44A, a total capacity column 44B, a capacity threshold column 44C, a used amount column 44D, a media ID column 44E, a media type column 44F, a RAID configuration column 44G, a capacity column 44H, and a used amount column 44I as shown in FIG. 10.

Then, an apparatus ID of the corresponding storage apparatus 4 is assigned to the apparatus ID column 44A. Incidentally, the "corresponding storage apparatus" herein used means: the local storage apparatus if the relevant storage apparatus usage management table 44 is retained by the storage apparatus 4; or any of the storage apparatuses 4 in the computer system 1 if the relevant storage apparatus usage management table 44 is retained by the management apparatus 7.

Moreover, the total capacity column 44B stores the total capacity of the corresponding storage apparatus 4 and the capacity threshold column 44C stores a threshold value of a ratio of the remaining capacity to the preset total capacity (hereinafter referred to as the capacity threshold). Furthermore, the used amount column 44D stores the current used amount of storage areas in the relevant storage apparatus 4.

The media ID column 44E stores a unique identifier (media ID) in this computer system 1, which is assigned to each storage device 10 (FIG. 11) in the corresponding storage apparatus 4. Moreover, the media type column 44F stores the type of the relevant storage device 10 (such as SSD, SAS or SATA) and the RAID configuration column 44G stores a RAID configuration of a RAID group RG constituted from the relevant storage device 10. Furthermore, the capacity column 44H stores the capacity of the relevant storage media 10 and the used amount column 44I stores the current used amount of the relevant storage media 10.

Accordingly, in the case of FIG. 10, it is shown that the total capacity of a storage apparatus 4 with the apparatus ID "110" is "14100 GB," its capacity threshold is "60%," and "6130 GB" out of the total capacity has already been used. FIG. 10 also shows that this storage apparatus 4 is constituted from the storage media 10 whose media IDs are "340," "350," "360," "370," and so on, the storage media 10 of those storage media, to which the media ID "340" is assigned, is an "SSD" whose capacity is "100 GB" and which constitutes a RAID group RG of a "4D+1" RAID configuration, and the storage capacity of "30 GB" has already been used.

The copy pair management table 45 is retained by each of the storage apparatuses 4 and the management apparatus 7. In the case of the storage apparatus 4, the copy pair management table 45 is used to manage copy pairs constituted from logical volumes VOLs in the local storage apparatus; and in the case of the management apparatus 7, the copy pair management table 45 is used to manage all copy pairs existing in the computer system 1. This copy pair management table 45 is constructed from a pair ID column 45A, a primary logical volume column 45B, and a secondary logical volume column 45C as shown in FIG. 11.

The pair ID column 45A stores a unique identifier (pair ID) in the computer system 1, which is assigned to the corresponding copy pair. Moreover, the primary logical volume column 45B is constructed from a storage apparatus ID column 45BA and a volume ID column 45BB; and the volume ID column 45BB stores the volume ID of a primary logical volume VOL constituting the corresponding copy pair; and the storage apparatus ID column 45BA stores the apparatus ID of a storage apparatus 4 in which the relevant primary logical volume VOL is created.

Similarly, the secondary logical volume column 45C is constructed from a storage apparatus ID column 45CA and a volume ID column 45CB; and the volume ID column 45CB stores the volume ID of a secondary logical volume VOL constituting the corresponding copy pair; and the storage apparatus ID column 45CA stores the apparatus ID of a storage apparatus 4 in which the relevant secondary logical volume VOL is created.

Accordingly, in the case of FIG. 11, it is shown that a copy pair with the pair ID "1" is constituted from a primary logical volume VOL, to which the volume ID "1" is assigned, in a storage apparatus 4 with the apparatus ID "1," and a secondary logical volume VOL, to which the volume ID "1" is assigned, in a storage apparatus 4 with the apparatus ID "2."

On the other hand, the storage apparatus management table 46 is a table used to manage the storage apparatuses 4 constituting the virtual storage apparatus VST and is constructed from an apparatus ID column 46A, a vendor name column 46B, a type name column 46C, a production number column 46D, a default virtual vendor name column 46E, a default virtual type name column 46F, a default virtual production number column 46G, a management communication interface address column 46H, and a group ID column 46I as shown in FIG. 12.

Then, the apparatus ID column 46A stores the apparatus ID assigned to each of the storage apparatuses 4 constituting the virtual storage apparatus VST. Moreover, the vendor name column 46B stores a vendor name of a vendor of the corresponding storage apparatus 4, the type name column 46C stores a type name of the relevant storage apparatus 4, and the production number column 46 stores a production number of the relevant storage apparatus 4.

Furthermore, the default virtual vendor name column 46E stores a virtual vendor name of a virtual storage apparatus VST constituted from the corresponding storage apparatus 4, the default virtual type name column 46F stores a virtual type name of the relevant virtual storage apparatus VST, and the default virtual production number column 46G stores a virtual production number of the relevant virtual storage apparatus VST.

Furthermore, the management communication interface address column 46H stores an IP address of a communication interface for management in the corresponding storage apparatus 4 and the group ID column 46I stores the group ID of a storage group to which the relevant storage apparatus 4 belongs.

Accordingly, in the case of FIG. 12, it is shown that the vendor name, the type name, and the production number of a storage apparatus 4, to which the storage apparatus ID "1" is assigned are "WXYZ," "STORAGE1," and "101" respectively and the default vendor name, the type name, and the production number of the virtual storage apparatus VST constituted from the relevant storage apparatus 4 are set to "XWYZ," "VSTORAGE10," and "1000" respectively. FIG. 12 also shows that the IP address of the communication interface for management of the relevant storage apparatus 4 is "192.168.1.200" and the relevant storage apparatus 4 belongs to a storage group with the group ID "1."

Figure 13:
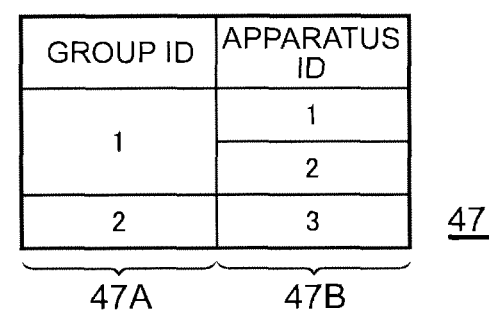

The group ID reverse lookup management table 47 is a table used to manage the storage apparatuses 4 constituting each storage group and is constructed from a group ID column 47A and a storage apparatus ID column 47B as shown in FIG. 13.

Then, the group ID column 47A stores a group ID assigned to each storage group that is set in the relevant computer system 1, and the storage apparatus ID column 47B stores apparatus IDs of all the storage apparatuses belonging to the storage group to which the corresponding group ID is assigned.

Accordingly, in the case of FIG. 13, it is shown that a storage group, to which the group ID "1" is assigned, is constituted from a storage apparatus, to which the apparatus ID "1" is assigned, and a storage apparatus to which the apparatus ID "2" is assigned.

(3) Various Processing relating to Storage Apparatus Grouping Function and Copy Pair Setting Function, etc Next, an explanation will be given about the specific processing content of storage apparatus grouping processing, copy pair setting processing, and I/O command reception processing executed at the management apparatus 7 and the storage apparatus 4 in relation to, for example, the storage apparatus grouping function and the copy pair setting function according to this embodiment described above.

(3-1) Storage Apparatus Grouping Processing
(3-1-1) Various Screen Structures

Figure 14:
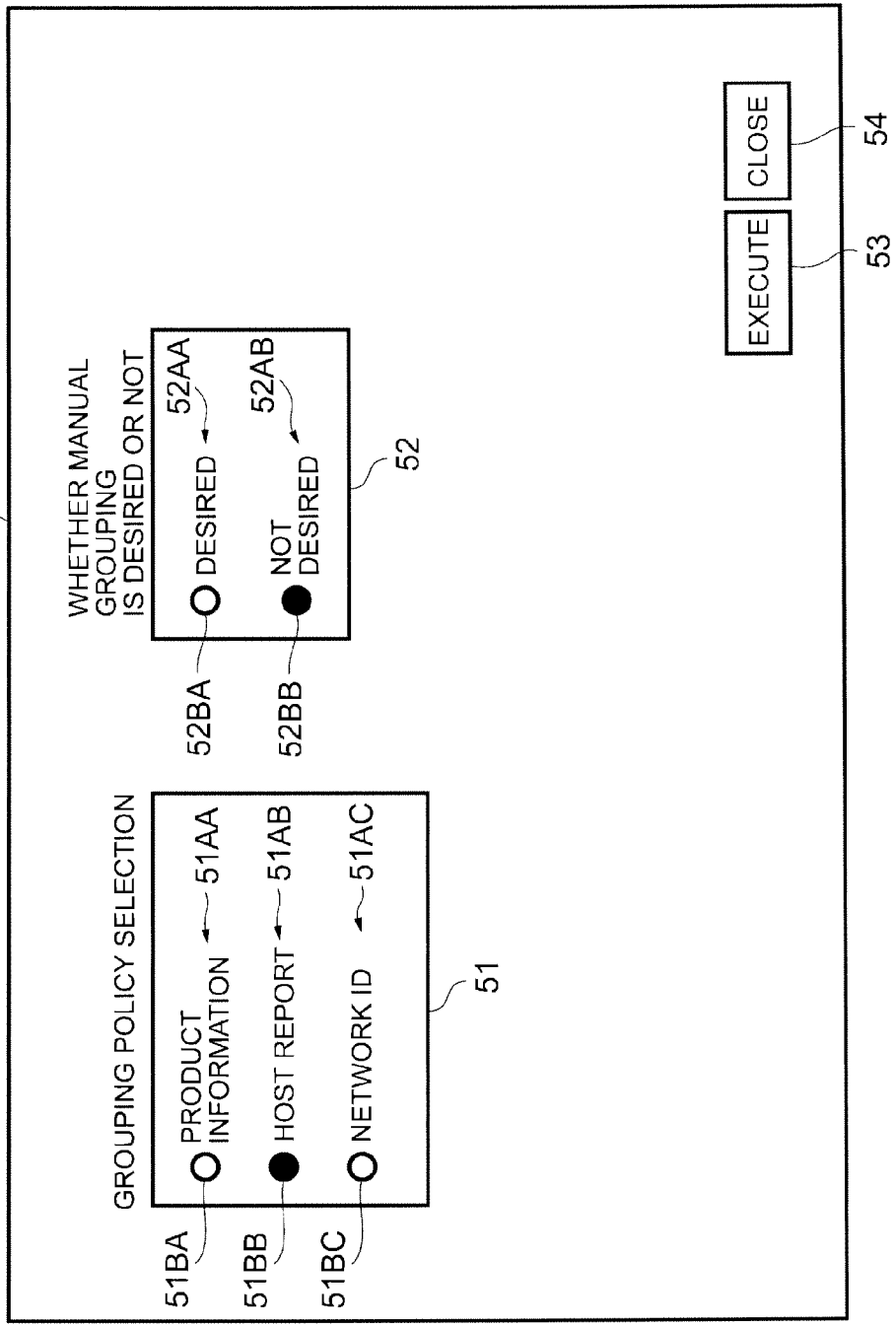
FIG. 14 is a schematic diagram showing a schematic structure of a grouping policy selection screen.

FIG. 14 shows a grouping policy selection screen 50 that can be displayed on the management apparatus 7 by operating the management apparatus 7. The system administrator can select one desired grouping policy from among the aforementioned first to fourth grouping policies as the grouping policy when grouping the storage apparatuses 4, by using this grouping policy selection screen 50, and can group the storage apparatuses 4, which constitute a virtual storage apparatus VST, in accordance with the selected grouping policy.

Practically, this grouping policy selection screen 50 includes a grouping policy selection field 51, a manual grouping selection field 52, an execute button 53, and a close button 54.

Then, letter strings 51AA to 51AC "Product Information," "Host Report," and "Network ID" which are associated with the aforementioned first to third grouping policies, respectively, and three toggle buttons 51BA to 51BC associated with the above-mentioned letter strings 51AA to 51AC are displayed in the grouping policy selection field 51. Thus, the system administrator can select the relevant grouping policy as the grouping policy used when grouping the storage apparatuses 4, by clicking the letter string 51AA to 51AC or the toggle button 51BA to 51BC which represents the desired grouping policy from among the three letter strings 51AA to 51AC or the toggle buttons 51BA to 51BC (associated with those letter strings 51AA to 51AC) which are displayed in the grouping policy selection field 51. Furthermore, the toggle button 51BA to 51BC which is associated with the then selected grouping policy is turned on.

Furthermore, letter strings 52AA, 52AB "Desired" and "Not Desired" and two toggle buttons 52BA, 52BB which are associated with the above-mentioned letter strings 52AA, 52AB are displayed in the manual grouping selection field 52 corresponding to the aforementioned fourth grouping policy. Thus, if the system administrator wishes to group the storage apparatuses 4 manually, they click the letter string 52AA "Desired" or the toggle button 52BA associated with that letter string 52AA; and if the system administrator does not wish to group the storage apparatuses 4 manually (or wishes to group the storage apparatuses 4 automatically), they click the letter string 52AB "Not Desired" or the toggle button 52BB associated with that letter string 52AB. As a result, it is possible to select whether to group the storage apparatuses 4 manually or not. Also, the toggle button 52BB which is associated with the then selected option is turned on.

Then, when the system administrator wishes to group the storage apparatuses 4 automatically, they turn on the toggle button 51BA to 51BC associated with the desired grouping policy in the grouping policy selection field 51, and turns on the toggle button 52BB associated with the letter string 52AB "Not Desired" in the manual grouping selection field 52, and clicks the execute button 53; and if the system administrator wishes to group the storage apparatuses 4 manually, they turn on the toggle button 52BA associated with the letter string 52AA "Desired" in the manual grouping selection field 52 and then click the execute button 53. In this way, the management apparatus 7 can be made to execute the storage apparatus grouping processing for automatically or manually grouping the storage apparatuses 4 constituting the virtual storage apparatus VST.

Figure 15:
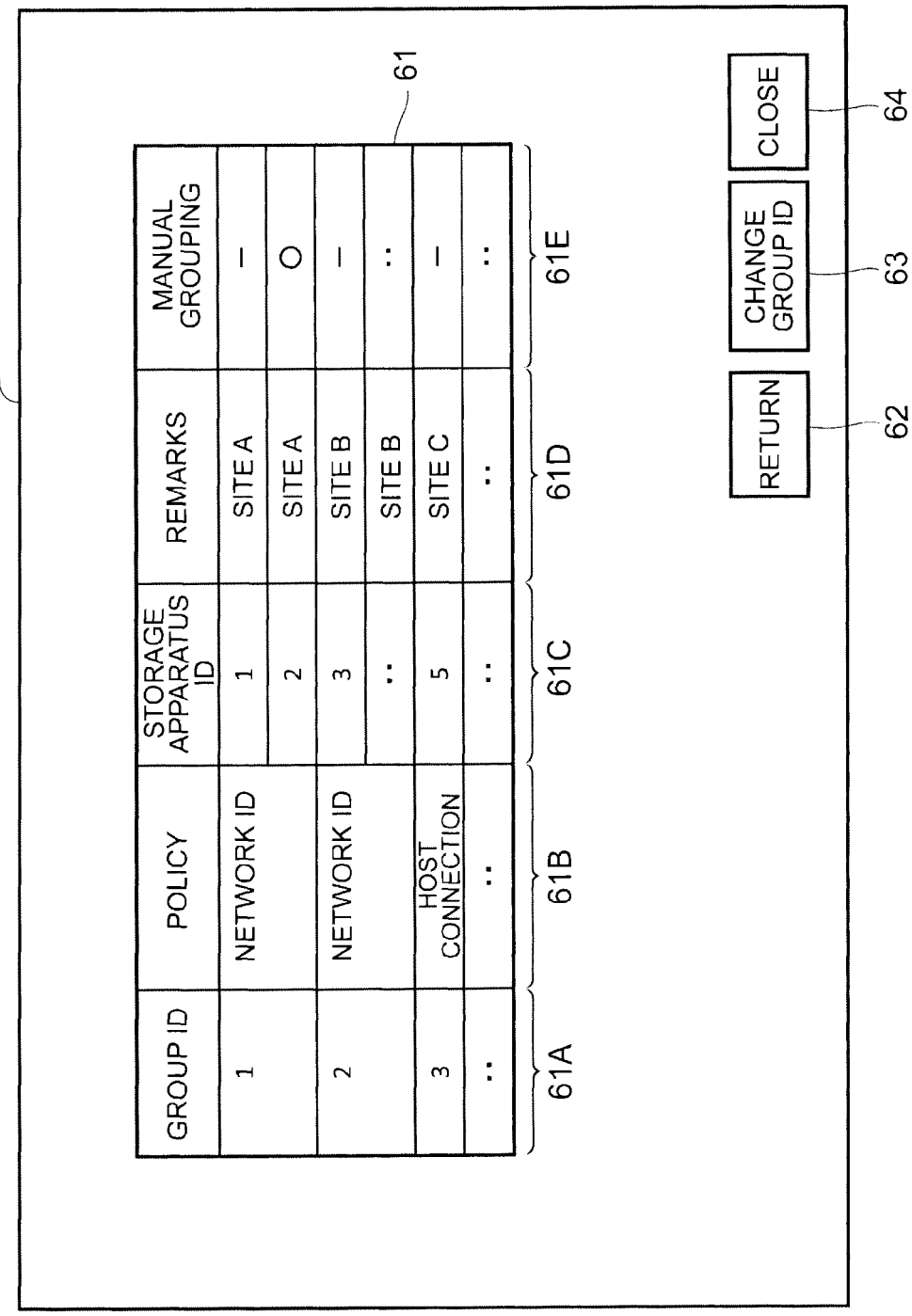
FIG. 15 is a schematic diagram showing a schematic structure of a grouping result display screen.

Meanwhile, after executing the storage apparatus grouping processing, the management apparatus 7 displays the processing results on, for example, a grouping result display screen 60 shown in FIG. 15. This grouping result display screen 60 includes a grouping result list 61, a return button 62, a group ID change button 63, and a close button 64.

The grouping result list 61 is constructed from a group ID column 61A, a grouping policy column 61B, a storage apparatus ID column 61C, a remarks column 61D, and a manual grouping column 61E. Then, the group ID assigned to each storage group created by the storage apparatus grouping processing at that time or before then is displayed in the group ID column 61A.

Furthermore, a grouping policy used when creating the corresponding storage group is displayed in the grouping policy column 61B and the apparatus IDs of all storage apparatuses 4 belonging to the relevant storage group are displayed in the storage apparatus ID column 61C. Furthermore, a comment which is input by the system administrator about the individual storage apparatus 4 with the apparatus ID displayed in the storage apparatus ID column 61C (a site name of the site (FIG. 1) where the relevant storage apparatus 4 is installed in FIG. 15) is displayed in the remarks column 61D; and when the storage group to which the corresponding storage apparatus 4 belongs is changed manually, a mark ("O") indicating such change of the storage group is displayed in the manual grouping column 61.

Then, the grouping result display screen 60 can return to the grouping policy selection screen 50 (FIG. 14) by clicking the return button 62; and this grouping result display screen 60 can be closed by clicking the close button 64. Moreover, the grouping result display screen 60 can be switched to a group ID change screen 70 shown in FIG. 16 by clicking the group ID change button 63.

The group ID change screen 70 is a screen used to manually change the storage group to which the storage apparatus 4 grouped by the storage apparatus grouping processing at that time or the storage apparatus grouping processing executed before then belongs; and is constructed from a group ID list 71, a return button 72, a set button 73, and a close button 74.

The group ID list 71 among the above-listed elements is constructed from a storage apparatus ID column 71A, a group ID column 71B, a new group ID column 71C, a grouping policy column 71D, and a remarks column 71E. Then, the apparatus ID of each storage apparatus 4 constituting the virtual storage apparatus VST is displayed in the storage apparatus ID column 71A. Furthermore, the group ID of a storage group allocated to the corresponding storage apparatus 4 is displayed in the group ID column 71B and the group ID of a storage group newly designated for the relevant storage apparatus 4 is stored in the new group ID column 71C.

Figure 16:
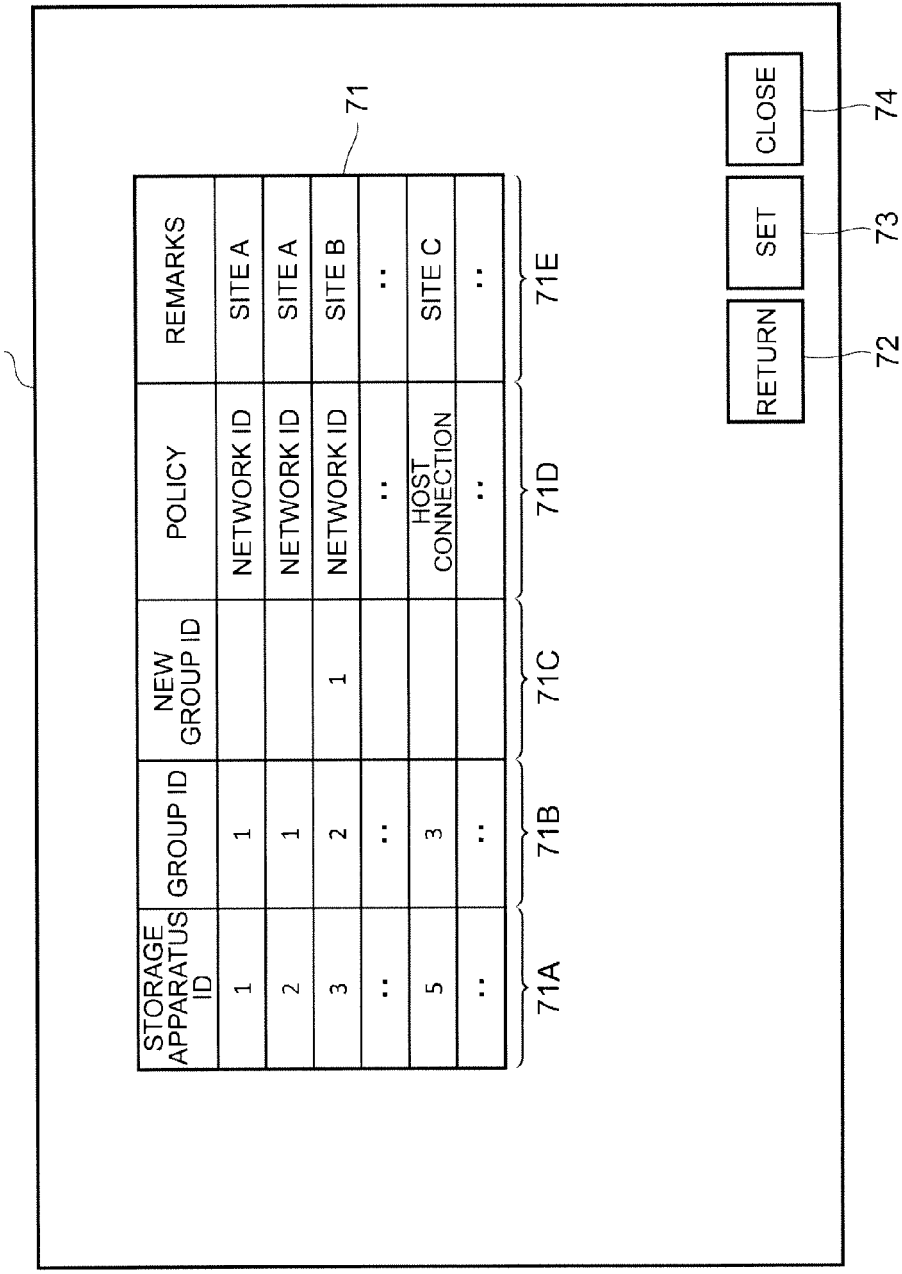
FIG. 16 is a schematic diagram showing a schematic structure of a group ID change screen.

Furthermore, the grouping policy used when grouping the relevant storage apparatus 4 into the corresponding storage group is displayed in the grouping policy column 71D and a comment input by the system administrator about the relevant storage apparatus 4 (the site name of the site 2 where the relevant storage apparatus 4 is installed in FIG. 16) is displayed in the remarks column 71.

Then, with the group ID change screen 70, a storage group to which the relevant storage apparatus 4 belongs can be changed to a storage group with the group ID then displayed in the new group ID column 71C by inputting the group ID of the postchange storage group to the new group ID column 71C associated with the storage apparatus 4, for which the change of the storage group is desired, in the group ID list 71 and then clicking the set button 73. Moreover, the group ID change screen 70 can return to the previous screen (the grouping policy selection screen 60) by clicking the return button 72 and the group ID change screen 70 can be closed by clicking the close button 74.

(3-1-2) Automatic Grouping Processing

Figure 17:
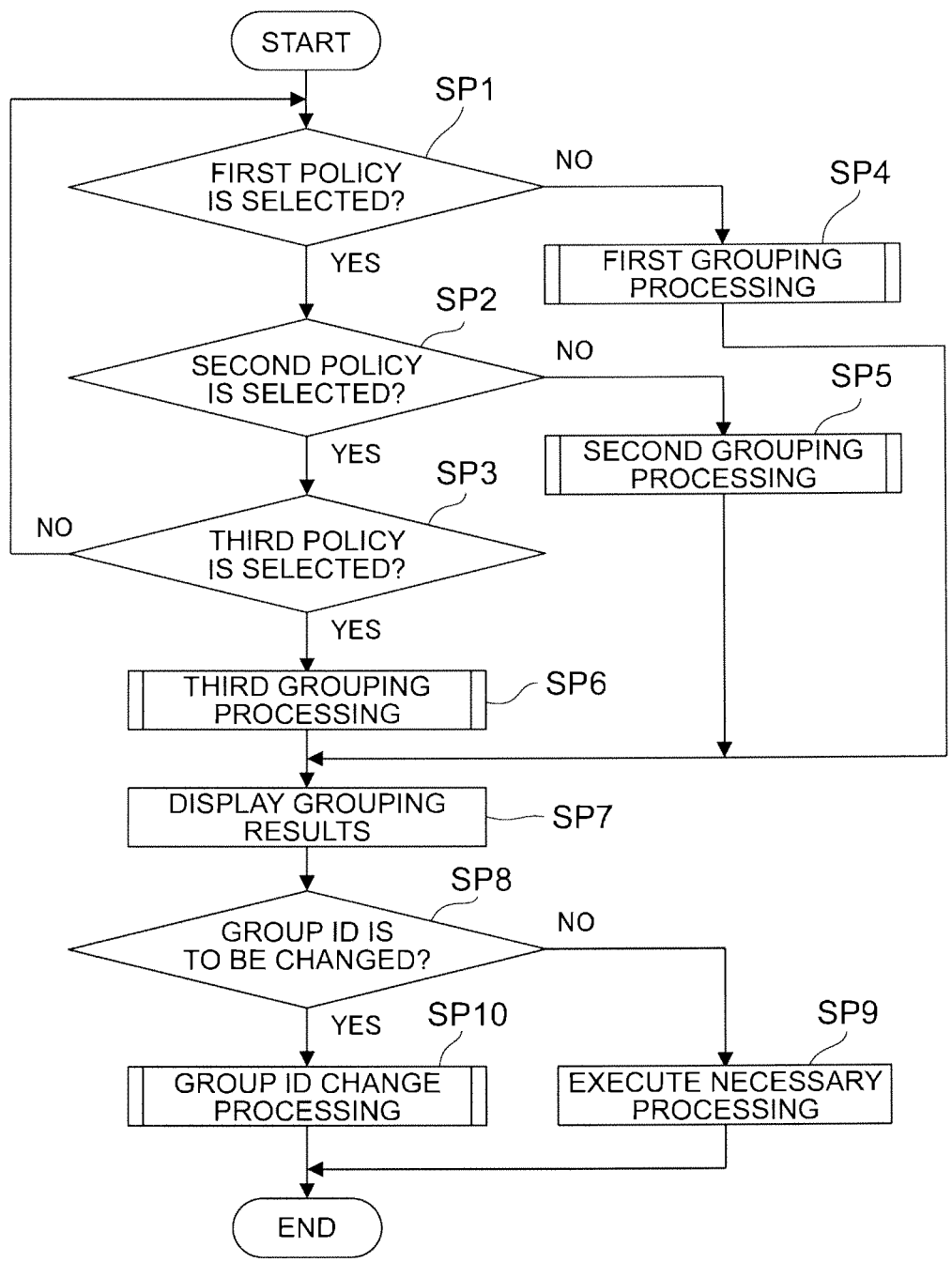
FIG. 17 is a flowchart illustrating a processing sequence for automatic grouping processing.

FIG. 17 shows a processing sequence for automatic grouping processing executed by the CPU 30 (FIG. 1) for the management apparatus 7 when the execute button 53 is clicked in a state where the toggle button 51BA to 51BC associated with any of the grouping policies in the grouping policy selection field 51 on the grouping policy selection screen 50 is turned on and the toggle button 52BB associated with the letter string 52BB "Not Desired" in the manual grouping selection field 52 is turned on. The CPU 30 groups each of storage apparatuses 4 constituting a virtual storage apparatus VST according to the grouping policy selected on the grouping policy selection screen 50 in accordance with the processing sequence shown in this FIG. 17.

Practically, when the execute button 53 is clicked in the above-described state, the CPU 30 starts the automatic grouping processing shown in this FIG. 17 and firstly judges which grouping policy from among the first to third grouping policies is selected on the grouping policy selection screen 50 as the grouping policy to be used when grouping the storage apparatuses 4 constituting the virtual storage apparatus VST (SP1 to SP3).

Then, if the CPU 30 determines that the first grouping policy is selected, it executes grouping processing in accordance with the first grouping policy (hereinafter referred to as the first grouping processing) (SP4); and if the CPU 30 determines that the second grouping policy is selected, it executes grouping processing in accordance with the second grouping policy (hereinafter referred to as the second grouping processing) (SP5); and if the CPU 30 determines that the third grouping policy is selected, it executes grouping processing in accordance with the third grouping policy (hereinafter referred to as the third grouping processing) (SP6). Subsequently, the CPU 30 has the management apparatus 7 display the grouping result display screen 60 (FIG. 15) on which the grouping results by the first to third grouping processing are indicated (SP7).

Next, the CPU 30 waits for any one of the return button 62, the group ID change button 63, and the close button 64 on the grouping result display screen 60 to be clicked; and if any one of these buttons is eventually clicked, the CPU 30 judges whether that button is the group ID change button 63 or not (SP8).

If the CPU 30 obtains a negative judgment result in this step, it executes processing corresponding to the clicked button (SP9). Specifically speaking, if the clicked button is the return button 62, the CPU 30 makes the display screen of the management apparatus 7 return to the grouping policy selection screen 50 (FIG. 14); and if the clicked button is the close button 64, the CPU 30 closes the grouping result display screen 60. The CPU 30 then terminates this automatic grouping processing.

On the other hand, if the CPU 30 obtains an affirmative judgment result in step SP8, it executes the group ID change processing for changing the group ID of the storage apparatus 4 in response to a request from the system administrator (SP10) and then terminates this automatic grouping processing.

Figure 18:
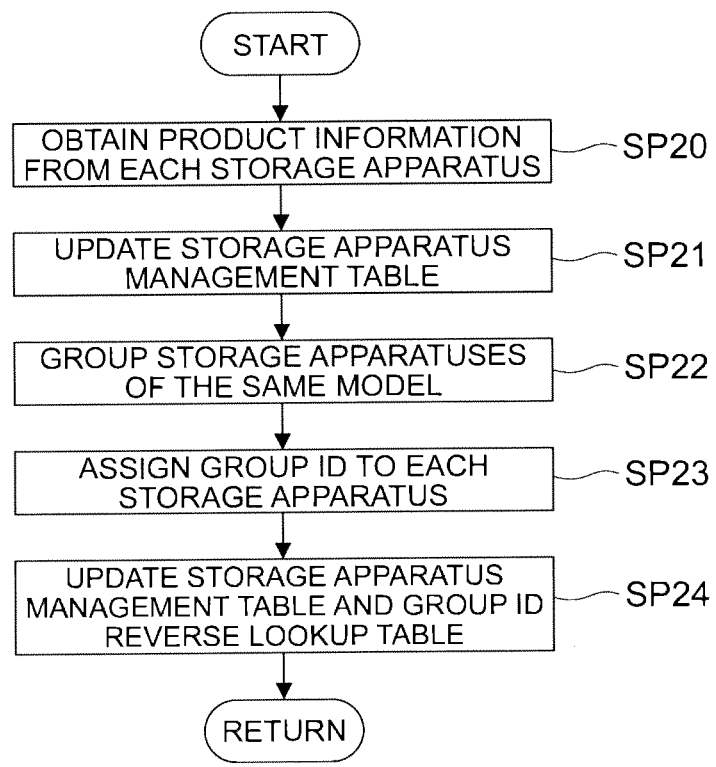
FIG. 18 is a flowchart illustrating a processing sequence for first grouping processing.

Incidentally, FIG. 18 shows a specific processing sequence for the first grouping processing executed by the CPU 30 in step SP4 of the automatic grouping processing.

When the CPU 30 proceeds to step SP4 of the storage grouping processing, it starts the first grouping processing shown in this FIG. 18. The CPU 30 firstly refers to the storage apparatus management table 46 (FIG. 12) and sends an inquiry command to all storage apparatuses 4 constituting the virtual storage apparatus VST, so that it obtains configuration information of these storage apparatuses 4, including product information such as the relevant vendor names, type names, and production names, from the storage apparatuses 4 (SP20).

Subsequently, the CPU 30 updates the storage apparatus management table 46 to the latest state based on the product information of each storage apparatus 4, which was obtained in step SP20 (SP21). Then, the CPU 30 refers to the updated storage apparatus management table 46 and executes processing for grouping the storage apparatuses 4 of the same model into the same storage group (SP22). Specifically speaking, in this step SP22, the CPU 30 groups the storage apparatuses 4 with the same product name to make them belong to the same storage group.

Next, the CPU 30 assigns a unique group ID to each storage group created by the processing in step SP22 and assigns the group ID of a storage group, to which the relevant storage apparatus 4 belongs, to each storage apparatus 4 (SP23). Furthermore, the CPU 30 updates the storage apparatus management table 46 (FIG. 12) and the group ID reverse lookup table 47 (FIG. 13) according to the processing results of the processing in step SP22 and step SP23 (SP24). Subsequently, the CPU 30 terminates this first grouping processing and returns to the storage grouping processing.

Figure 19:
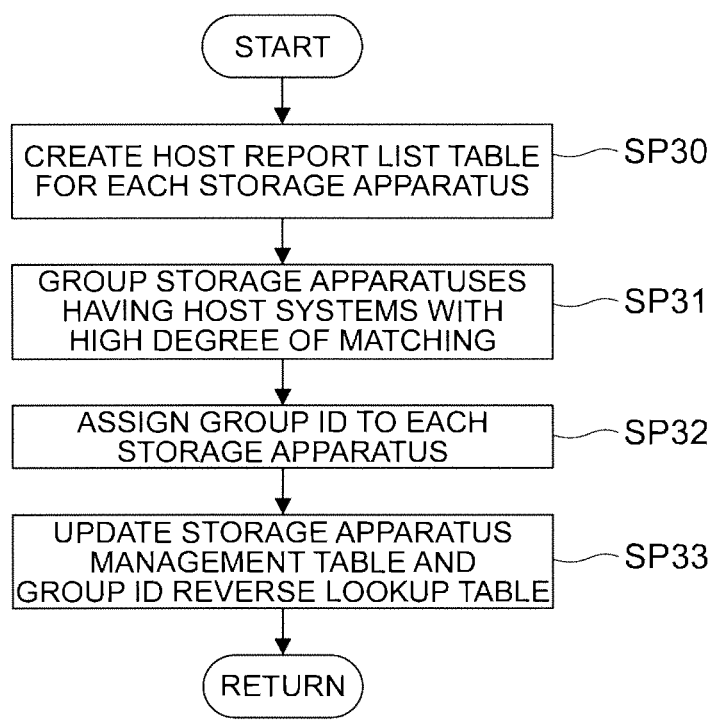
FIG. 19 is a flowchart illustrating a processing sequence for second grouping processing.

Furthermore, FIG. 19 shows a specific processing sequence for the second grouping processing executed by the CPU 30 in step SP5 of the storage grouping processing (FIG. 17).

When the CPU 30 proceeds to step SP5 of the storage grouping processing, it starts the second grouping processing shown in this FIG. 19 and firstly obtains access information about accesses from the host system(s) 3 from each storage apparatus 4. This access information is information, which is stored in software mounted in each storage apparatus 4, about each host system 3 which has accessed the relevant storage apparatus 4. Then, after collecting the access information from each storage apparatus 4, the CPU 30 creates a host report list table (not shown) indicating access frequency (the number of accesses) of each host system 3, which has accessed the relevant storage apparatus 4, for each storage apparatus 4 based on the collected access information (SP30).

Subsequently, the CPU 30 compares the host report list tables, each of which was created for each storage apparatus 4 in step SP30, and groups the storage apparatuses 4 so that the storage apparatuses 4 with a high degree of matching regarding which the number of accesses from the host system 3 is high (for example, the storage apparatuses 4 regarding which the number of common host systems, among a plurality of highly-accessed host systems 3 with a large number of accesses, is more than a predetermined threshold value) will be made to belong to the same storage group (SP31). Since in this case the number of accesses from the same host system 3 to the storage apparatuses 4 installed at the same site becomes high, the storage apparatuses 4 installed at the same site 2 (FIG. 1) can be grouped into the same storage group by the above-described grouping method.

Next, the CPU 30 assigns a unique group ID to each storage group created by the processing in step SP31 and assigns the group ID of a storage group, to which the relevant storage apparatus 4 belongs, to each storage apparatus 4 (SP32). Furthermore, the CPU 30 updates the storage apparatus management table 46 (FIG. 12) and the group ID reverse lookup table 47 (FIG. 13) according to the processing results of the processing in step SP31 and step SP32 (SP33), and then terminates this second grouping processing and returns to the storage grouping processing.

Figure 20:
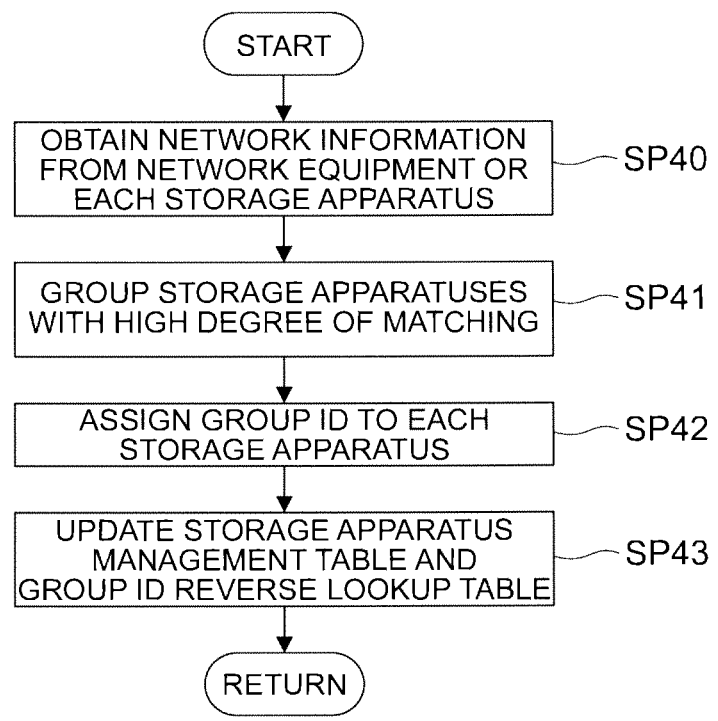
FIG. 20 is a flowchart illustrating a processing sequence for third grouping processing.

Furthermore, FIG. 20 shows a specific processing sequence for the third grouping processing executed by the CPU 30 in step SP6 of the storage grouping processing.

When the CPU 30 proceeds to step SP6 of the storage grouping processing, it starts the third grouping processing shown in FIG. 20. The CPU 30 firstly obtains zone information from each network equipment such as a switch constituting the first network 5 (FIG. 1) or obtains a network address of a management port (not shown in the drawing) from each of the storage apparatuses 4 constituting the virtual storage apparatus VST (SP40).

Subsequently, the CPU 30 groups the storage apparatuses 4 based on the zone information obtained from each network equipment or the network address of the management port, which was obtained from each storage apparatus 4, in step SP40 so that the storage apparatuses 4 belonging to the same zone or the storage apparatuses having the same subset mask as the network address will be made to belong to the same storage group (SP41). Under this circumstance, the storage apparatuses 4 installed at the same site 2 (FIG. 1) belong to the same zone over the network in many cases. Furthermore, the storage apparatuses 4 installed at the same site 2 often have the same subnet mask as the network address. Therefore, the storage apparatuses 4 installed at the same site 2 can be grouped into the same storage group by the above-described method.

Next, the CPU 30 assigns a unique group ID to each storage group created by the processing in step SP41 and assigns the group ID of a storage group, to which the relevant storage apparatus 4 belongs, to each storage apparatus 4 (SP42). Furthermore, the CPU 30 updates the storage apparatus management table 46 (FIG. 12) and the group ID reverse lookup table 47 (FIG. 13) according to the processing results of the processing in step SP41 and step SP42 (SP43), and then terminates this third grouping processing and returns to the storage grouping processing.

Figure 21:
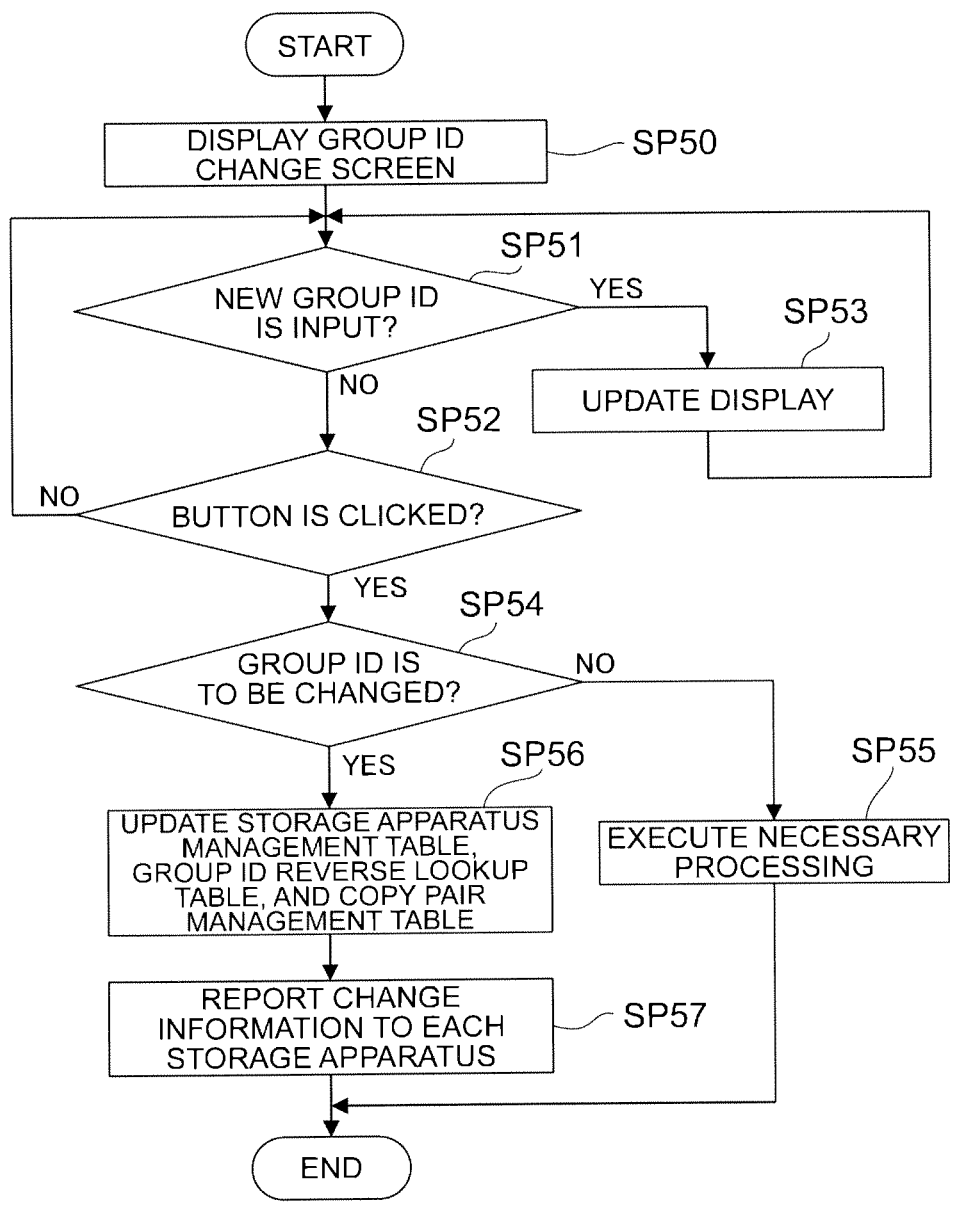
FIG. 21 is a flowchart illustrating a processing sequence for group ID change processing.

On the other hand, FIG. 21 shows a specific processing sequence for the group ID change processing executed by the CPU 30 in step SP10 of the storage grouping processing (FIG. 17).

When the CPU 30 proceeds to step SP10 of the storage grouping processing, it starts the group ID change processing shown in this FIG. 21 and firstly makes the management apparatus 7 display the group ID change screen 70 which was described with reference to FIG. 16 (SP50).

Subsequently, the CPU 30 waits for a new group ID to be input to any entry of the new group column 71C on the group ID change screen 70 or for any of the return button 72 (FIG. 16), the set button 73 (FIG. 16), and the close button 74 (FIG. 16) to be clicked (SP51, SP52).

Then, when a new group ID is input to any entry of the new group column 71C on the group ID change screen 70, the CPU 30 updates the group ID list 71 so that the entered new group ID will be displayed in the new group ID column 71C (SP53).

Then, if any of the buttons 72 to 74 is clicked, the CPU 30 judges whether that button 72 to 74 is the set button 73 or not (SP54). Then, if the CPU 30 obtains a negative judgment result in this step, it executes necessary processing corresponding to that button (SP55). Specifically speaking, if the clicked button is the return button 72, the CPU 30 makes the display screen on the management apparatus 7 return to the grouping result display screen 60 (FIG. 15); and if the clicked button is the close button 74, the CPU 30 closes this group ID change screen 70. Then, the CPU 30 terminates this group ID change processing.

On the other hand, if the CPU 30 obtains an affirmative judgment result in step SP54, it updates the storage apparatus management table 46 (FIG. 12), the group ID reverse lookup table 47 (FIG. 13), and the copy pair management table 45 (FIG. 11) in the management apparatus 7 to make them match the content displayed in the group ID list 71 on the group ID change screen 70 (SP56).

Furthermore, the CPU 30 sends update information indicating how the group ID of which storage apparatus 4 has been updated by the above-described processing, to each storage apparatus 4 (SP57), and then terminates this group ID change processing. Thus, each storage apparatus 4 which has received the update information updates necessary parts of the virtual volume management table 40 (FIG. 6) retained by each local storage apparatus, based on the update information.

(3-1-3) Manual Grouping Processing

Figure 22:
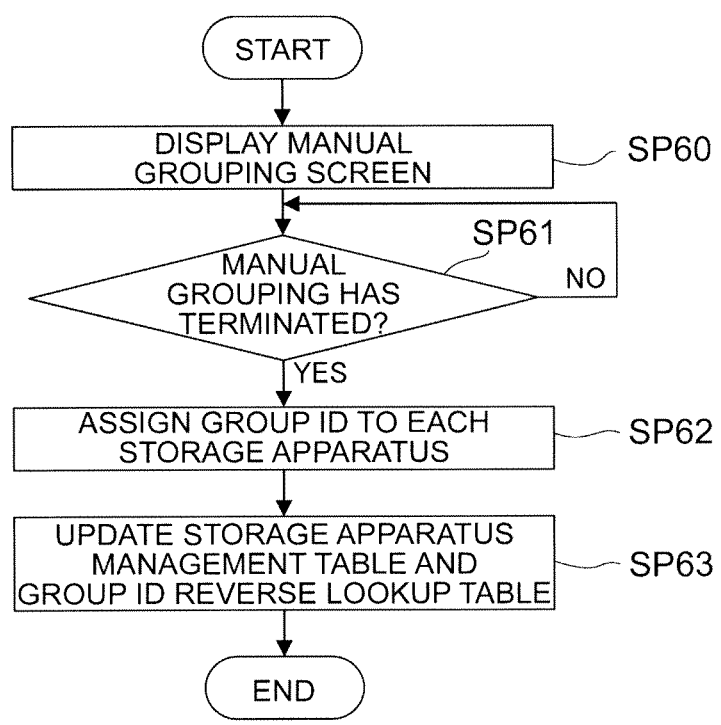
FIG. 22 is a flowchart illustrating a processing sequence for manual grouping processing.

On the other hand, FIG. 22 shows a processing sequence for manual grouping processing executed by the CPU 30 for the management apparatus 7 when the execute button 53 (FIG. 14) is clicked in a state where the toggle button 52BA (FIG. 14) associated with the letter string 52AA (FIG. 14) "Desired" is turned on in the manual grouping selection field 52 (FIG. 14) of the grouping policy selection screen 50 described earlier with reference to FIG. 14. The CPU 30 groups the storage apparatuses 4 constituting the virtual storage apparatus VST based on an instruction given by the system administrator in accordance with the processing sequence shown in this FIG. 22.

Practically, when the execute button 53 is clicked in a state where the toggle button 52BA associated with the letter string 52AA "Desired" is turned on in the manual grouping selection field 52 (FIG. 14) of the grouping policy selection screen 50 described earlier with reference to FIG. 14, the CPU 30 starts the manual grouping processing shown in this FIG. 22 and firstly makes the management apparatus 7 display a specified manual grouping screen (not shown) for manually grouping the storage apparatuses 4 (SP60).

Subsequently, the CPU 30 waits for a storage group, to which each storage apparatus 4 belongs, to be designated by the system administrator on that manual grouping screen (SP61). Then, having finished designating all the storage groups to which the respective storage apparatuses 4 belong, the CPU 30 assigns the group ID of the storage group of each storage apparatus 4, which was designated on the manual grouping screen, to each storage apparatus 4 (SP62).

Next, the CPU 30 updates each of the storage apparatus management table 46 (FIG. 12) and the group ID reverse lookup table 47 (FIG. 13) to make the group ID, which was assigned to each storage apparatus in step SP62, reflected in those tables (SP63), and then terminates this manual grouping processing.

(3-1-4) Additional Storage Apparatus Registration Processing

When a new storage apparatus 4 is to be additionally registered as a storage apparatus 4 constituting a virtual storage apparatus VST in this computer system 1, it is necessary for the system administrator to give an instruction to the management apparatus 7 to additionally register that new storage apparatus 4 as a constituent storage apparatus of the virtual storage apparatus VST (hereinafter referred to as the additional storage apparatus registration instruction).

Figure 23:
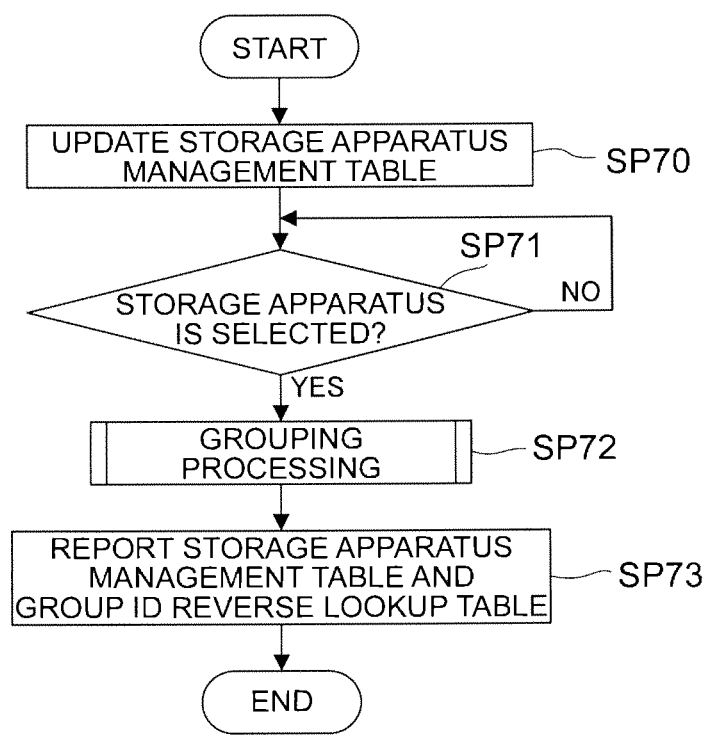
FIG. 23 is a flowchart illustrating a processing sequence for additional storage apparatus registration processing.

FIG. 23 shows a processing sequence for additional storage apparatus registration processing executed by the CPU 30 for the management apparatus 7 when the above-described additional storage apparatus registration instruction is given. When such an additional storage apparatus registration instruction is given, the CPU 30 additionally registers the new storage apparatus 4 as a constituent storage apparatus of the virtual storage apparatus VST in accordance with the processing sequence shown in this FIG. 23.

Practically, when the above-described additional storage apparatus registration instruction is given, the CPU 30 starts the additional storage apparatus registration processing as shown in FIG. 23 and firstly obtains configuration information, such as the relevant vendor names, type names, and production numbers, from the storage apparatuses 4 by sending an inquiry command to each of the storage apparatuses 4 then constituting the virtual storage apparatus VST, and updates the storage apparatus management table 46 based on the obtained configuration information (SP70).

Subsequently, the CPU 30 waits for the storage apparatus 4, which should be newly added as a constituent apparatus of the virtual storage apparatus VST, to be designated by the operator (SP71); and when the storage apparatus 4 is eventually selected, the CPU 30 executes grouping processing for determining a storage group to which the relevant storage apparatus 4 should belong (SP72). Incidentally, such grouping processing executed at that time is performed by executing the first to third grouping processing (FIG. 18 to FIG. 20) corresponding to the grouping policy selected last on the grouping policy selection screen 50 described earlier with reference to FIG. 14 or by executing the manual grouping processing described earlier with reference to FIG. 22.

Next, the CPU 30 notifies each of the storage apparatuses 4 constituting the virtual storage apparatus VST of the updated content of the storage apparatus management table 46 (FIG. 12) and the group ID reverse lookup table 47 (FIG. 13) which were updated in the grouping processing executed in step SP72 (SP73). Thus, each storage apparatus 4 which has received this notice updates necessary parts of the virtual volume management table 40 (FIG. 6) in the local storage apparatus in accordance with the content of the storage apparatus management table 46 and the group ID reverse lookup table 47 after the update. Then, the CPU 30 terminates this additional storage apparatus registration processing.

(3-2) Copy Pair Setting Processing (3-2-1) Various Screen Structures

Figure 24:
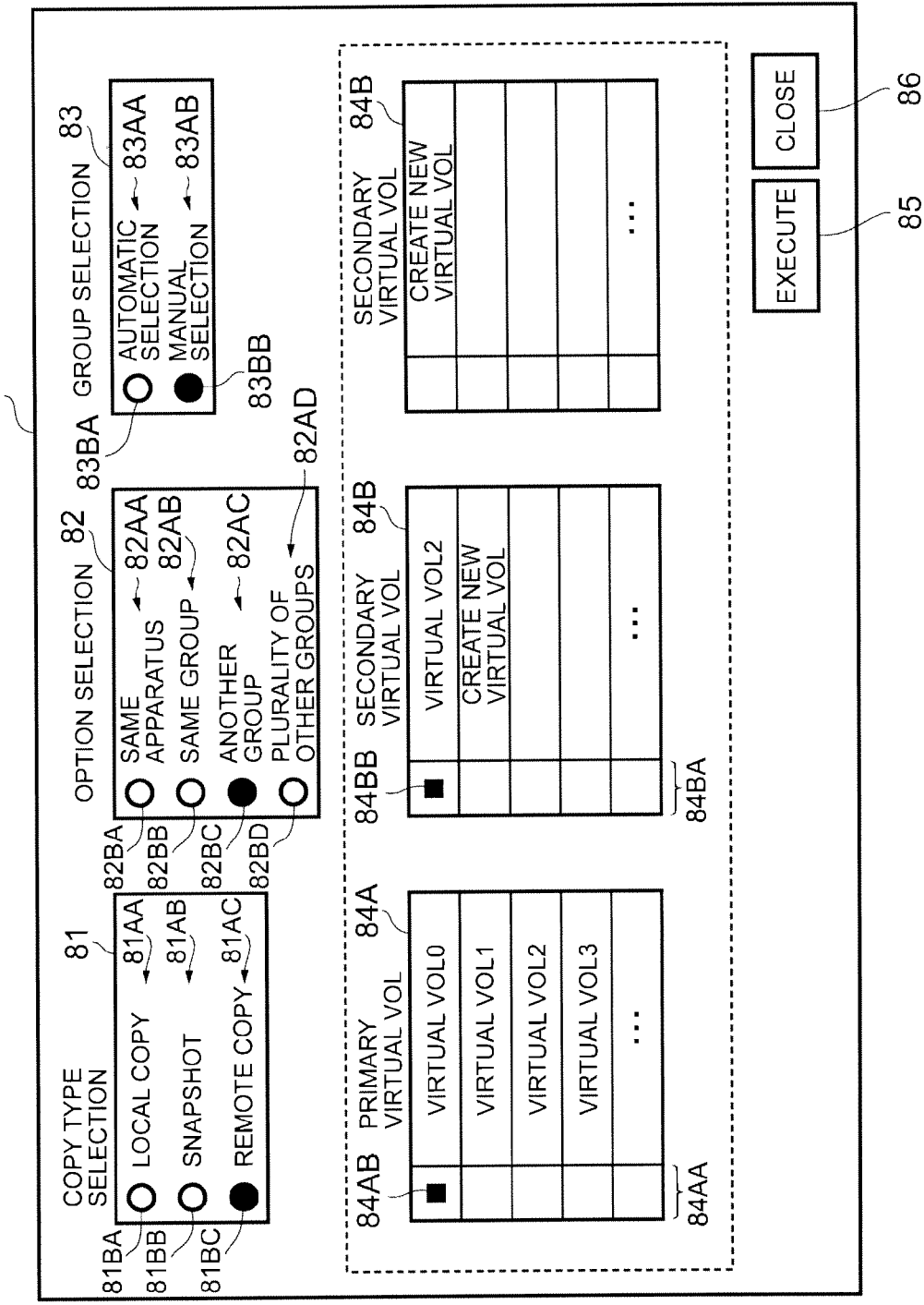
FIG. 24 is a schematic diagram showing a schematic structure of a copy pair setting screen.

FIG. 24 shows a copy pair setting screen 80 that can be displayed on the management apparatus 7 by a specified operation. This copy pair setting screen 80 is a GUID (Graphical User Interface) screen used, when creating a copy pair of virtual volumes VVOLs as described earlier, to select a primary virtual volume VVOL and a secondary virtual volume VVOL, and the copy type of replication copying to be executed on the relevant copy pair and make settings to decide in which storage apparatus 4 of which storage group the logical volumes VOLs to be mapped to the primary virtual volume VVOL and the secondary virtual volume VVOL, respectively, should be selected.

Practically, the copy pair setting screen 80 of this example includes a copy type selection field 81, an option selection field 82, a group selection field 83, a pair volume selection field 84, an execute button 85, and a close button 86.

Then, three letter strings 81AA to 81AC "Local Copy," "Snapshot," and "Remote Copy," each of which indicates the copy type of replication copying executable by this computer system 1, and toggle buttons 81BA to 81BC associated with these letter strings 81AA to 81AC, respectively, are displayed in the copy type selection field 81. Thus, the operator can select the relevant copy type as the copy type of replication copying which should be executed on a copy pair to be created at that time by clicking the letter string 81AA to 81AC or the toggle button 81BA to 81BC which indicates a desired copy type from among the three letter strings 81AA to 81AC or the toggle buttons 81BA to 81BC associated with these letter strings 81AA to 81AC displayed in the copy type selection field 81. Moreover, the toggle button 81BA to 81BC associated with the then selected copy type is turned on.

Furthermore, letter strings 82AA to 82AD "Same Apparatus," "Same Group," "Another Group," and "Plurality of Other Groups" indicating the location relationship between a logical volume (hereinafter referred to as the primary logical volume) VOL associated with the primary virtual volume VVOL of the copy pair to be created at that time and at least one logical volume (hereinafter referred to as the secondary logical volume) VOL associated with the secondary virtual volume VVOL of the copy pair, and four toggle buttons 82BA to 82BD associated with these letter strings 82AA to 82AD, respectively, are displayed in the option selection field 82. Thus, the system administrator can select the relevant location relationship as the location relationship between the primary logical volume VOL and the secondary logical volume VOL by clicking the letter string 82AA to 82AD or the toggle button 82BA to 82BD associated with a desired location relationship from among the toggle buttons 82BA to 82BD displayed in the option selection field 82. Moreover, the toggle button 82BA to 82BD associated with the then selected location relationship is turned on.

Incidentally, the "Same Apparatus" among the location relationships between the primary logical volume VOL and the secondary logical volume VOL means that the primary logical volume VOL and the secondary logical volume VOL should be selected from logical volumes VOLs existing in the same storage apparatus 4. This letter string 82AA is displayed as invalid when the letter string 81AC (option) "Remote Copy" is selected in the copy type selection field 81.

Moreover, the "Same Group" means that the primary logical volume VOL and the secondary logical volume VOL should be selected from logical volumes VOLs existing in different storage apparatuses 4 belonging to the same storage group.

Furthermore, "Another Group" means that the primary logical volume VOL and the secondary logical volume VOL should be selected from logical volumes VOLs existing in storage apparatuses 4 belonging to different storage groups; and the "Plurality of Other Groups" means that a plurality of secondary virtual volumes VOLs are provided and the primary logical volume VOL and each secondary logical volume VOL should be selected from logical volumes VOLs existing in different storage apparatuses 4 belonging to different storage groups.

The letter strings 82AB to 82AD the "Same Group", "Another Group," and the "Plurality of Other Groups" are displayed as invalid when the letter string 81AA, 81AB (option) "Local Copy" or "Snapshot" is selected in the copy type selection field 81.

Two letter strings 83AA, 83AB "Automatic Selection" and "Manual Selection" for selecting the primary logical volume VOL and the secondary logical volume VOL either automatically or manually, and two toggle buttons 83BA, 83BB associated with these letter strings 83AA, 83AB, respectively, are displayed in the group selection field 83. Thus, the system administrator can decide either automatic selection or manual selection to select the primary logical volume VOL and the secondary logical volume VOL, by clicking a desired letter string 83AA, 83AB or toggle button 83BA, 83BB among these two letter strings 83AA, 83AB or the toggle buttons 83BA, 83BB associated with these letter strings 83AA, 83AB. Then, the toggle button 83BA, 83BB associated with the then selected option is turned on.

On the other hand, a primary virtual volume candidate list 84A and a plurality of secondary virtual volume candidate lists 84B are displayed in the pair volume selection field 84. Then, virtual volume IDs of all virtual volumes VVOL that can be the primary virtual volume VVOL candidates of the copy pair to be created at that time are displayed in the primary virtual volume candidate list 84A.

Thus, the system administrator can select the relevant virtual volume VVOL as the primary virtual volume VVOL of the copy pair by clicking a row, where the virtual volume ID of a desired virtual volume VVOL is displayed, from among the virtual volume IDs displayed in the primary virtual volume candidate list 84A. Then, a mark 84AB indicating that the relevant virtual volume VVOL has been selected is displayed in a designated mark display column 84AA associated with the then selected virtual volume VVOL.

Similarly, virtual volume IDs of all virtual volumes VVOL which can be candidates of the secondary virtual volume VVOL of the copy pair to be created at that time and has the same capacity as that of the virtual volume VVOL selected in the primary virtual volume candidate list 84A are displayed in each secondary virtual volume candidate list 84B. This secondary virtual volume candidate list 84B also includes an option "Create New Virtual VOL" which means that a new virtual volume VVOL should be created as the secondary virtual volume VVOL.

Thus, the system administrator can select the relevant virtual volume VVOL as the secondary virtual volume VVOL of the copy pair by clicking a row, where the virtual volume ID of a desired virtual volume VVOL is displayed, from among the virtual volumes VVOL displayed in the relevant secondary virtual volume candidate list 84B. Then, a mark 84BB indicating that the relevant virtual volume VVOL has been selected is displayed in a selected mark display column 84AA associated with the then selected virtual volume VVOL. Furthermore, if the virtual volume ID of the desired virtual volume VVOL is not listed in the secondary virtual volume candidate list 84B, a new virtual volume VVOL can be created in the virtual storage apparatus VST as the secondary virtual volume VVOL of the relevant copy pair by selecting the option "Create New Virtual VOL."

Then, with the copy pair setting screen 80, it is possible to have the management apparatus 7 create the corresponding copy pair by selecting desired options in the copy type selection field 81 and the option selection field 82, selecting "Automatic Selection" in the group selection field 83, and further selecting the primary virtual volume VVOL and the secondary virtual volume VVOL in the pair volume selection field 84, and then clicking the execute button 85.

Figure 25:
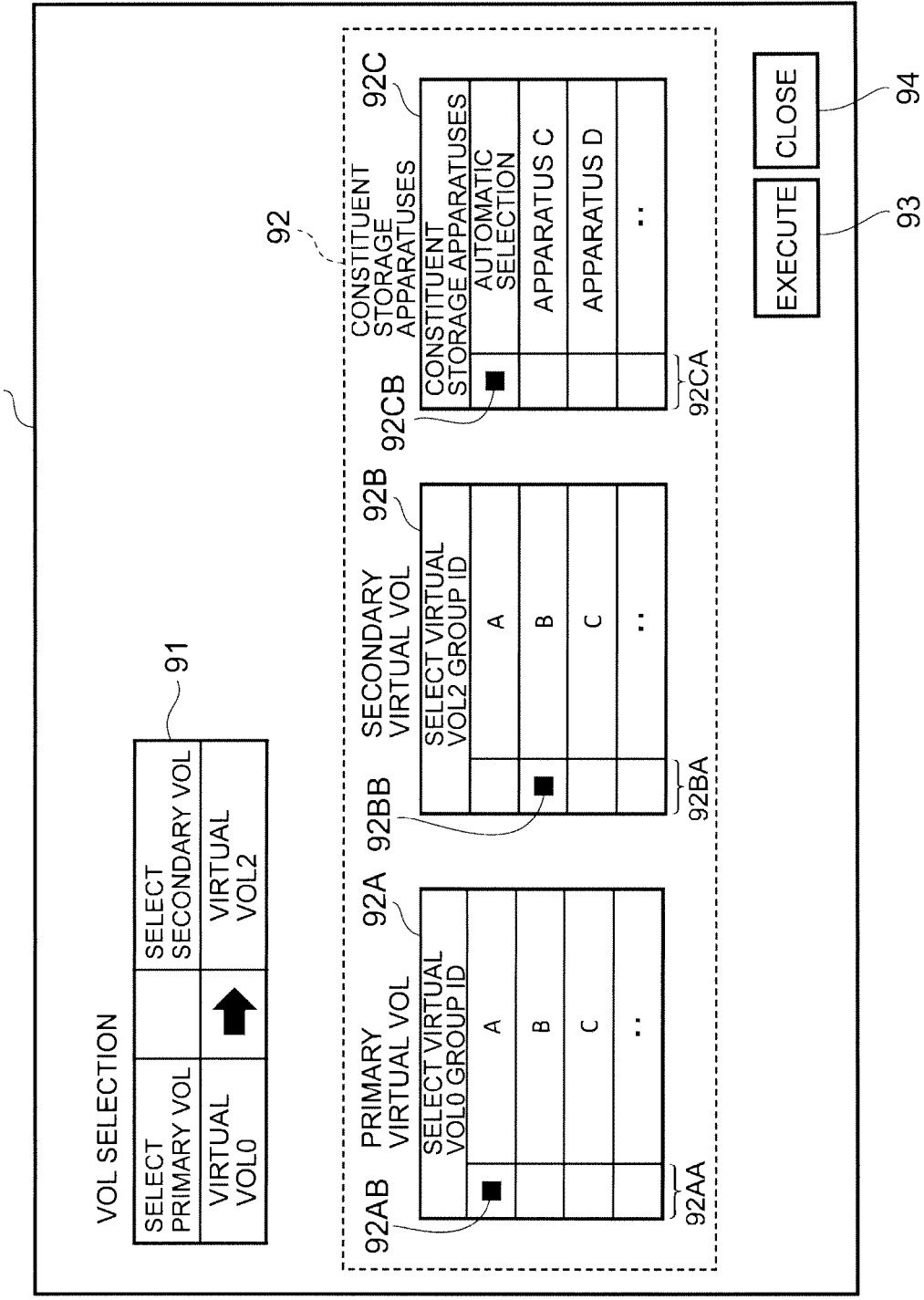
FIG. 25 is a schematic diagram showing a schematic structure of a copy pair manual setting screen.

Furthermore, the copy pair setting screen 80 can be switched to the copy pair manual setting screen 90 shown in FIG. 25 by selecting "Manual Selection" in the group selection field 83, further selecting the primary virtual volume VVOL and the secondary virtual volume VVOL respectively in the pair volume selection field 84, and then clicking the execute button 85; and furthermore, the copy pair setting screen 80 can be closed by clicking the close button 86.

On the other hand, the copy pair manual setting screen 90 is a GUI screen used by the system administrator to manually select a storage group of the storage apparatus 4, in which the primary logical volume VVOL of the copy pair selected on the copy pair setting screen 80 is created, and a storage group of the storage apparatus 4 in which the secondary logical volume VVOL of that copy pair is created; and the copy pair manual setting screen 90 includes a selected volume display field 91, a group selection field 92, an execute button 93, and a close button 94.

Then, virtual volume IDs of the primary virtual volume VVOL and the secondary virtual volume VVOL selected on the copy pair setting screen 80 are displayed respectively in the selected volume display field 91.

Furthermore, a group ID list 92A for the primary virtual volume VVOL, a group ID list 92B for the secondary virtual volume VVOL, and a constituent storage apparatus list 92C are displayed in the group selection field 92.

Then, group IDs of all storage groups existing at that time are displayed in the group ID list 92A for the primary virtual volume VVOL. Thus, the system administrator can select the relevant group ID as the group ID of a storage group to which the storage apparatus 4 with the primary logical volume VOL to be created therein belongs, by clicking a row, in which a desired group ID is displayed, from among the group IDs displayed in this group ID list 92A for the primary virtual volume VVOL. Then, a mark 92AB indicating that the relevant group ID has been selected is displayed in a designated mark display column 92AA associated with the then selected group ID.

Similarly, group IDs of all storage groups existing at that time are displayed in the group ID list 92B for the secondary virtual volume VVOL. Thus, the system administrator can select the relevant group ID as the group ID of a storage group to which the storage apparatus 4 with the secondary logical volume VOL to be created therein belongs, by clicking a row, in which a desired group ID is displayed, from among the group IDs displayed in this group ID list 92B for the secondary virtual volume VVOL. Then, a mark 92BB indicating that the relevant group ID has been selected is displayed in a designated mark display column 92BA associated with the then selected group ID.

Furthermore, apparatus IDs of all the storage apparatuses constituting the storage group selected in the group ID list 92B for the secondary virtual volume VVOL are displayed in the constituent storage apparatus list 92C. Thus, the system administrator can select the storage apparatus 4, to which the relevant apparatus ID is assigned, as the storage apparatus 4 in which the secondary logical volume VOL is to be created, by clicking a row, in which the apparatus ID of a desired storage apparatus 4 is displayed, from among the apparatus IDs displayed in this constituent storage apparatus list 92C. Then, a mark 92CB indicating that the relevant apparatus ID has been selected is displayed in a designated mark display column 92CA associated with the then selected apparatus ID.

Incidentally, in the case of this embodiment, an option "Automatic Selection" is also displayed in the constituent storage apparatus list 92C in addition to the apparatus ID of each storage apparatus 4 constituting the storage group selected in the group ID list 92B for the secondary virtual volume VVOL. Thus, the system administrator can have the management apparatus 7 automatically select the storage apparatus 4, in which the secondary logical volume VOL should be created, from among the storage apparatuses 4 belonging to the storage group with the group ID selected in the group ID list 92B for the secondary virtual volume VVOL, by selecting the option "Automatic Selection."

(3-2-2) Copy Pair Setting Processing

Figure 26:
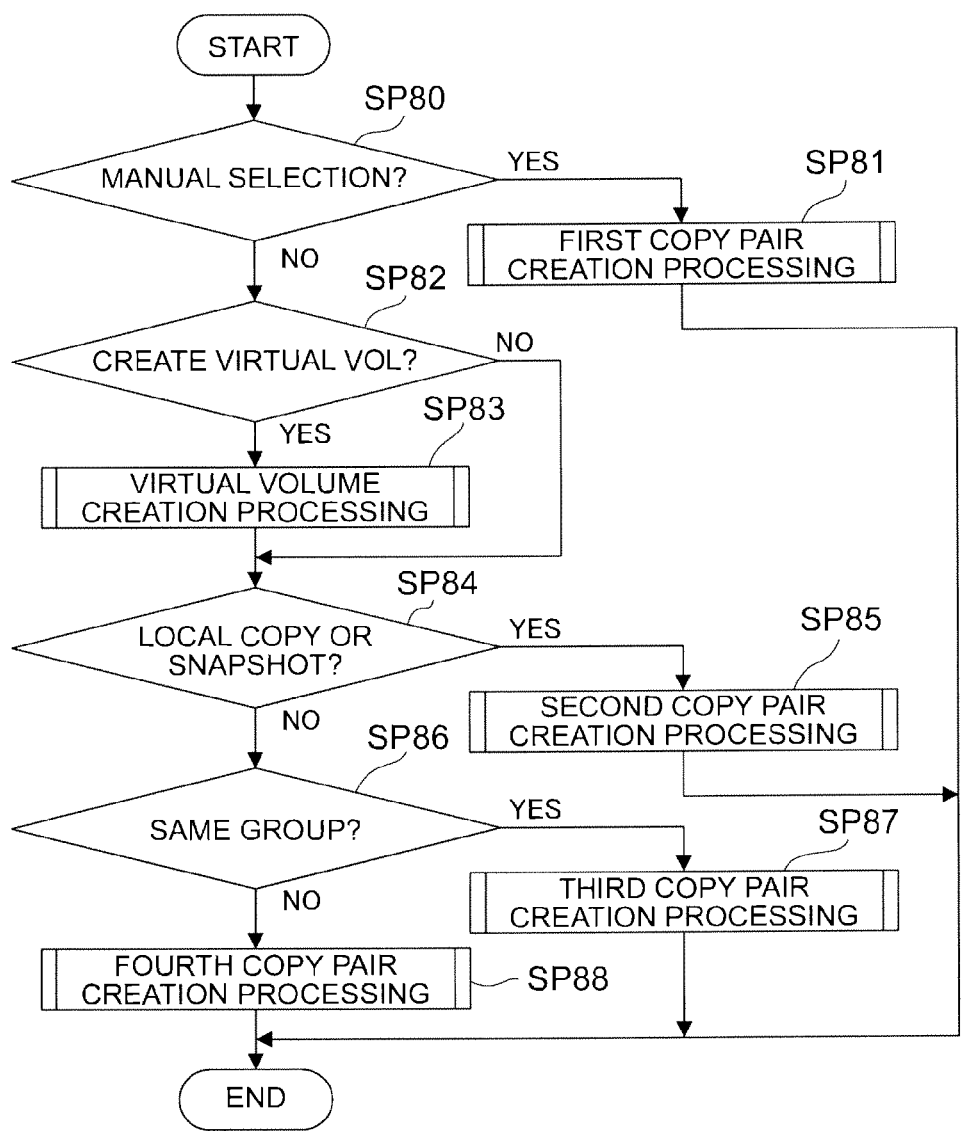
FIG. 26 is a flowchart illustrating a processing sequence for copy pair setting processing.

Now, FIG. 26 shows a processing sequence for copy pair setting processing executed by the CPU 30 for the management apparatus 7 when any of the options is selected in the copy type selection field 81 on the copy pair setting screen 80, the option selection field 82 and the group selection field 83, the primary virtual volume VVOL and the secondary virtual volume VVOL are selected respectively in the pair volume selection field 84, and then the execute button 85 is clicked. The CPU 30 sets a copy pair of the primary logical volume VOL and the secondary logical volume VOL in accordance with the processing sequence shown in FIG. 26.

Practically, when the execute button 85 is clicked as described above, the CPU 30 starts this copy pair setting processing and firstly judges whether or not the option "Manual Selection" is selected in the group selection field 83 on the copy pair setting screen 80 (SP80).

Then, if the CPU 30 obtains an affirmative judgment result in this step, it sets the primary logical volume VOL and the secondary logical volume VOL designated by the system administrator as a copy pair by executing the first copy pair setting processing (SP81), and then terminates this copy pair setting processing.

On the other hand, if the CPU 30 obtains a negative judgment result in step SP80, it judges whether or not it is necessary to create a new virtual VVOL in the virtual storage apparatus VST as the secondary virtual volume VVOL (SP82). This judgment is made by judging whether or not the option to create a new virtual volume VVOL ("Create New Virtual VOL") is selected in the secondary virtual volume candidate list 84B on the copy pair setting screen 80.

Then, if the CPU 30 obtains a negative judgment result in this step, it proceeds to step SP84. On the other hand, if the CPU 30 obtains an affirmative judgment result in this step, it executes virtual volume creation processing for creating the secondary virtual volume VVOL, which was designated on the copy pair setting screen 80, in the virtual storage apparatus VST (SP83).

Subsequently, the CPU 30 judges whether or not the copy type of replication copying, which should be executed on the copy pair to be created at that time, is either "Local Copy" or "Snapshot" (SP84). This judgment is made by judging whether either one of the options "Local Copy" and "Snapshot" is selected in the copy type selection field 81 on the copy pair setting screen 80.

Then, if the CPU 30 obtains an affirmative judgment result in this step, it sets a copy pair of the primary logical volume VOL and the secondary logical volume VOL existing in the same storage apparatus 4 (SP85). Specifically speaking, when the primary logical volume VOL and the secondary logical volume VOL are created in the same storage apparatus 4 at that time, the CPU 30 sets these primary logical volume VOL and secondary logical volume VOL as the copy pair by registering necessary information in the copy pair management table 45 (FIG. 11). Moreover, if the primary logical volume VOL and the secondary logical volume VOL are not created in the same storage apparatus 4 at that time, the CPU 30 creates the primary logical volume VOL and/or the secondary logical volume VOL, which have the same capacity as that of the primary virtual volume VVOL, in any of the storage apparatuses 4, maps the created primary logical volume VOL and/or secondary logical volume VOL to the corresponding primary virtual volume VVOL or secondary virtual volume VVOL, then registers necessary information in the copy pair management table 45 (FIG. 11), thereby setting the primary logical volume VOL and the secondary logical volume VOL as the copy pair. Then, the CPU 30 terminates this copy pair setting processing.

On the other hand, obtaining a negative judgment result in step SP84 means that the copy type selected in the copy type selection field 81 on the copy pair setting screen 80 is "Remote Copy"; and in this case, it means that the option selected in the option selection field 82 on the copy pair setting screen 80 is any one of the "Same Group", "Another Group," and the "Plurality of Other Groups."

Thus, if the CPU 30 obtains a negative judgment result in step SP84, it judges whether the option selected in the option selection field 82 on the copy pair setting screen 80 is the "Same Group" or not (SP86). Then, if the CPU 30 obtains an affirmative judgment result in this step, it executes the third copy pair setting processing for setting a copy pair of the primary logical volume VOL and the secondary logical volume VOL existing in different storage apparatuses 4 of the same storage group (SP87).

Specifically speaking, if the primary logical volume VOL and the secondary logical volume VOL are created in different storage apparatuses 4 of the same storage group, the CPU 30 sets these primary logical volume VOL and secondary logical volume VOL as a copy pair by registering necessary information in the copy pair management table 45 (FIG. 11). Moreover, if the primary logical volume VOL and the secondary logical volume VOL are not created in different storage apparatuses 4 of the same storage group at that time, the CPU 30 creates the primary logical volume VOL and/or the secondary logical volume VOL in different storage apparatuses 4 of the same storage group, maps the created primary logical volume VOL and/or secondary logical volume VOL to the corresponding primary virtual volume VVOL or secondary virtual volume VVOL, and then registering necessary information in the copy pair management table 45, thereby setting these primary logical volume VOL and secondary logical volume VOL as the copy pair. Then, the CPU 30 terminates this copy pair setting processing.

On the other hand, if the CPU 30 obtains a negative judgment result in step SP86, it executes the fourth copy pair setting processing for setting a copy pair of the primary logical volume VOL and the secondary logical volume VOL which exist in different storage apparatuses 4 of the same storage group (SP88).

Specifically speaking, if the primary logical volume VOL and the secondary logical volume VOL are created in the storage apparatuses 4 of different storage groups, the CPU 30 sets these primary logical volume VOL and secondary logical volume VOL as a copy pair by registering necessary information in the copy pair management table 45. Furthermore, if the primary logical volume VOL and the secondary logical volume VOL are not created in the storage apparatuses 4 of different storage groups at that time, the CPU 30 creates the primary logical volume VOL and/or the secondary logical volume VOL in the storage apparatuses 4 of different storage groups, maps the created primary logical volume VOL and/or secondary logical volume VOL to the corresponding primary virtual volume VVOL or secondary virtual volume VVOL, and then registers necessary information in the copy pair management table 45, thereby setting these primary logical volume VOL and secondary logical volume VOL as the copy pair. Then, the CPU 30 terminates this copy pair setting processing.

(3-2-3) Virtual Volume Creation Processing

Figure 27:
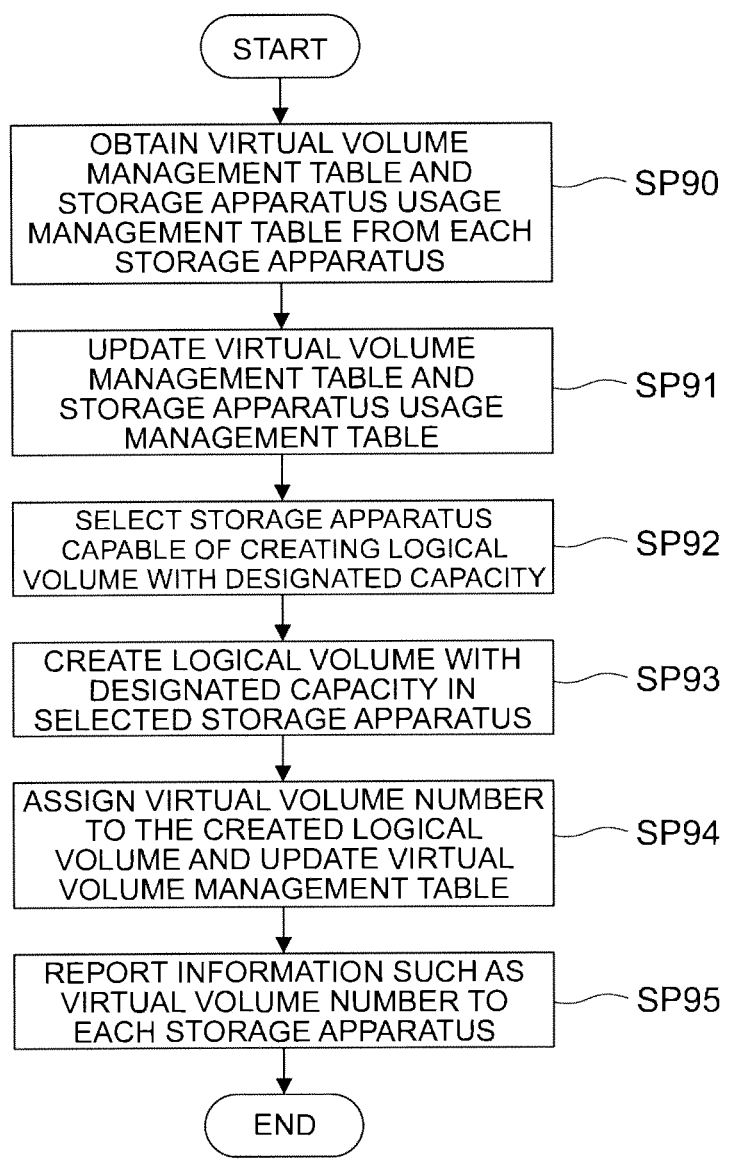
FIG. 27 is a flowchart illustrating a processing sequence for virtual volume creation processing.

Now, FIG. 27 shows a specific processing sequence for the virtual volume creation processing executed by the CPU 30 in step SP83 of the copy pair setting processing (FIG. 26).

When the CPU 30 proceeds to step SP83 of the copy pair setting processing, it starts the virtual volume creation processing shown in this FIG. 26 and firstly collects information of the virtual volume management table 40 (FIG. 6) and the storage apparatus usage management table 44 (FIG. 10), which are retained by the relevant storage apparatus 4, from each storage apparatus 4 (SP90).

Subsequently, the CPU 30 updates the virtual volume management table 40 and the storage apparatus usage management table 44, which are retained by the local management apparatus, to the latest state based on the information of the virtual volume management table 40 and the storage apparatus usage management table 44 collected from each storage apparatus 4 (SP91). When this happens, the CPU 30 assigns the virtual volume ID to a new virtual volume VVOL created at that time and registers necessary information in the virtual volume management table 40.

Next, the CPU 30 refers to the updated storage apparatus usage management table 44, selects a storage apparatus 4 whose used amount does not exceed a capacity threshold and in which a logical volume (primary logical volume or secondary logical volume) VOL with the designated capacity (the same capacity as that of the primary virtual volume VVOL) can be created (SP92), and creates a logical volume VOL with the designated capacity in the selected storage apparatus 4 (SP93).

Subsequently, the CPU 30 assigns the virtual volume ID to the relevant logical volume VOL and accordingly updates the virtual volume management table 40 in the local management apparatus (SP94). Furthermore, the CPU 30 reports the virtual volume ID of the then created virtual volume VVOL (the virtual volume VVOL registered in the virtual volume management table 40 in step SP91), the apparatus ID of the storage apparatus 4, in which the relevant logical volume VOL was created, the volume ID of the logical volume VOL associated with the relevant virtual volume VVOL in the relevant storage apparatus 4, and the group ID of the storage group, to which the relevant storage apparatus 4 belongs, to all the storage apparatuses 4 constituting the virtual storage apparatus VST (SP95).

Then, the CPU 30 terminates this virtual volume creation processing and returns to the copy pair setting processing.

(3-2-4) First Copy Pair Setting Processing

Figure 28:
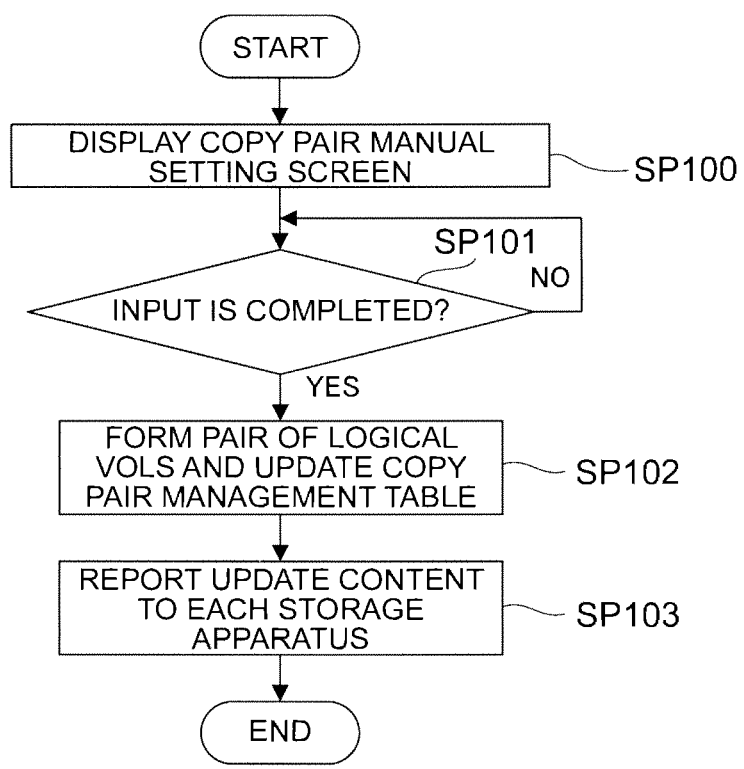
FIG. 28 is a flowchart illustrating a processing sequence for first copy pair setting processing.

FIG. 28 shows a specific processing sequence for the first copy pair setting processing executed by the CPU 30 in step SP81 of the copy pair setting processing (FIG. 26).

When the CPU 30 proceeds to step SP81 of the copy pair setting processing, it starts the first copy pair setting processing shown in this FIG. 28 and firstly makes the management apparatus 7 display the copy pair manual setting screen 90 (FIG. 25) described earlier with reference to FIG. 25 (SP100).

Subsequently, after the group ID of a storage group, to which the storage apparatus 4 with the primary logical volume VOL created therein should belongs, and the group ID of a storage group, to which the storage apparatus 4 with the secondary logical volume VOL created therein should belongs, are designated in the group selection field 92 on the copy pair manual setting screen 90, the CPU 30 waits for the execute button 93 (FIG. 25) to be clicked (SP101).

Then, when the execute button 93 is eventually clicked, the CPU 30 forms a copy pair of the primary logical volume VOL and the secondary logical volume VOL in accordance with the content designated at that time in the group selection field 92 on the copy pair manual setting screen 90 and updates the copy pair management table 45 accordingly (SP102), and notifies all the storage apparatuses 4 constituting the virtual storage apparatus VST of the update content of the copy pair management table 45 (SP103). Thus, each storage apparatus 4 which has received this notice updates the copy pair management table 45 in the local storage apparatus in accordance with the content of that notice.

Then, the CPU 30 terminates this first copy pair setting processing and returns to the copy pair setting processing.

(3-2-5) Second Copy Pair Setting Processing

Figure 29:
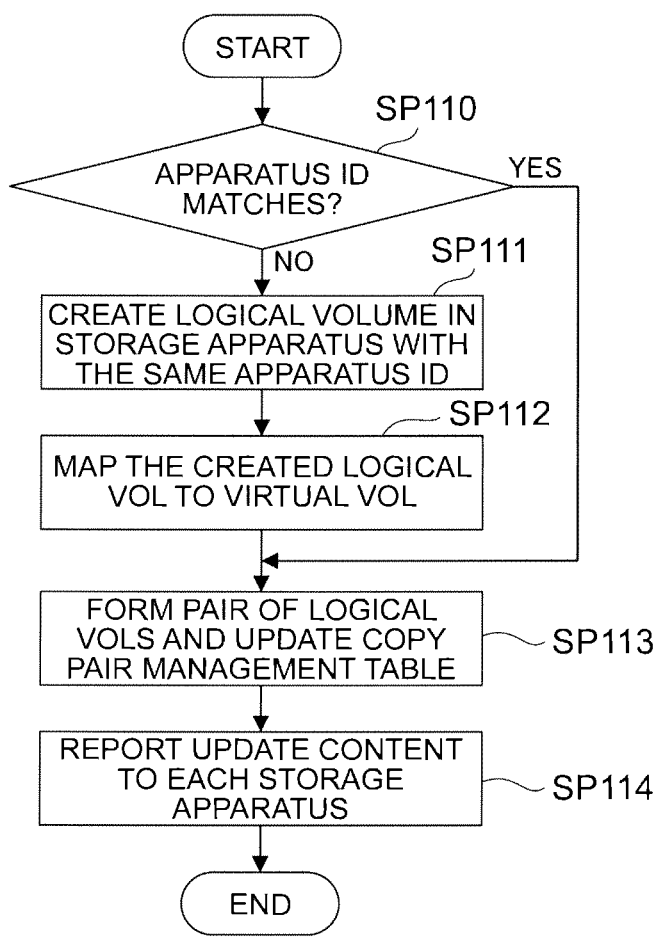
FIG. 29 is a flowchart illustrating a processing sequence for second copy pair setting processing.

FIG. 29 shows a specific processing sequence for the second copy pair setting processing executed by the CPU 30 in step SP85 of the copy pair setting processing (FIG. 26).

When the CPU 30 proceeds to step SP85 of the copy pair setting processing, it starts the second copy pair setting processing shown in this FIG. 29; and the CPU 30 firstly refers to the virtual volume management table 40 and judges whether the primary logical volume VOL mapped to the primary virtual volume VVOL and the secondary logical volume VOL mapped to the secondary virtual volume VVOL, regarding which the pair instruction was received on the copy pair setting screen 80, are created in the same storage apparatus 4 or not (SP110). Then, if the CPU 30 obtains an affirmative judgment result in this step, it proceeds to step SP113.

On the other hand, if the CPU 30 obtains a negative judgment result in step SP110, it refers to the storage apparatus usage management table 44 (FIG. 10) and creates the primary logical volume VOL and/or the secondary logical volume VOL with the designated capacity in the same storage apparatus 4 (SP111). Specifically speaking, if the storage apparatus 4 in which the primary logical volume VOL is created has a sufficient unused capacity, the CPU 30 creates a new secondary logical volume VOL with the designated capacity in the relevant storage apparatus 4. Also, if the storage apparatus 4 in which the secondary logical volume VOL is created has a sufficient unused capacity, the CPU 30 creates a new primary logical volume VOL with the designated capacity in the relevant storage apparatus 4. Furthermore, if neither the storage apparatus 4, in which the primary logical volume VOL is created, nor the storage apparatus 4, in which the secondary logical volume VOL is created, has a sufficient unused capacity, the CPU 30 create a new primary logical volume VOL and a new secondary logical volume VOL in a storage apparatus whose used amount does not exceed the capacity threshold and in which the primary logical volume VOL and the secondary logical volume VOL with the designated capacity can be created.

Subsequently, the CPU 30 maps the created primary logical volume VOL and/or secondary logical volume VOL to the corresponding primary virtual volume VVOL or secondary virtual volume VVOL (SP112). Moreover, the CPU 30 updates the copy pair management table 45 in the local management apparatus accordingly and notifies all the storage apparatuses 4 constituting the virtual storage apparatus VST of the update content of the copy pair management table 45 (SP114). Thus, each storage apparatus 4 which has received this notice updates the copy pair management table 45 in the local storage apparatus in accordance with the content of that notice.

Then, the CPU 30 terminates this second copy pair setting processing and returns to the copy pair setting processing.

(3-2-6) Third Copy Pair Setting Processing

Figure 30:
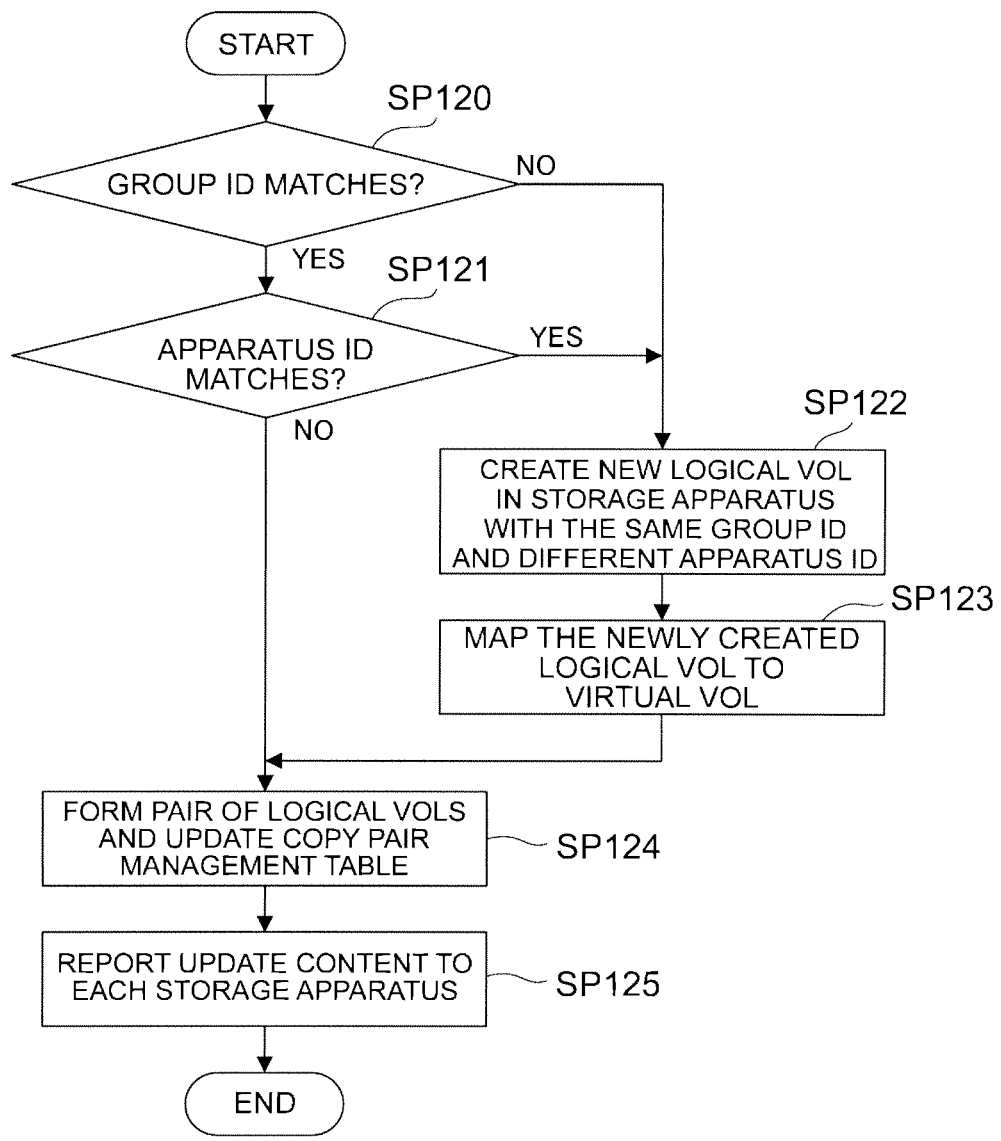
FIG. 30 is a flowchart illustrating a processing sequence for third copy pair setting processing.

FIG. 30 shows a specific processing sequence for the third copy pair setting processing executed by the CPU 30 in step SP87 of the copy pair setting processing (FIG. 26).

When the CPU 30 proceeds to step SP87 of the copy pair setting processing, it starts the third copy pair setting processing shown in this FIG. 30; and the CPU 30 firstly refers to the virtual volume management table 45 (FIG. 11) and judges whether the storage apparatus 4, in which the primary logical volume VOL mapped to the primary virtual volume VVOL is created, and the storage apparatus 4, in which the secondary logical volume VOL mapped to the secondary virtual volume VVOL is created, regarding which the pair instruction was received on the copy pair setting screen 80 (FIG. 24), belong to the same storage group or not (SP120).

Then, If the CPU 30 obtains an affirmative judgment result in this step, it refers to the virtual volume management table 40 (FIG. 6) and judges whether the primary logical volume VOL and the secondary logical volume VOL are created in the same storage apparatus 4 or not (SP121). Then, if the CPU 30 obtains a negative judgment result in this step, it proceeds to step SP124.

On the other hand, if the CPU 30 obtains a negative judgment result in step SP120 or if the CPU 30 obtains an affirmative judgment result in step SP121, it refers to the storage apparatus usage management table 44 (FIG. 10) and creates a primary logical volume VOL and/or secondary logical volume VOL with the designated capacity in different storage apparatuses 4 belonging to the same storage group (SP122). Specifically speaking, the CPU 30 leaves the primary logical volume VOL or the secondary logical volume VOL as they are and newly creates another secondary logical volume VOL or primary logical volume VOL in a storage apparatus 4, whose used amount does not exceed the capacity threshold and in which a logical volume VOL with the designated capacity can be created, from among storage apparatuses 4 different from the storage apparatuses 4 belonging to the same storage group as the storage apparatus 4, in which the relevant primary logical volume VOL or the relevant secondary logical volume VOL is created, or newly creates both a primary logical volume VOL and a secondary logical volume VOL in storage apparatuses 4, whose used amount does not exceed the capacity threshold and in which the primary logical volume VOL and secondary logical volume VOL with the designated capacity can be created, from among different storage apparatuses 4 belonging to the same storage group.

Subsequently, the CPU 30 maps the primary logical volume VOL and/or the secondary logical volume VOL, which were created in step SP122, to the conesponding primary virtual volume VVOL or the secondary virtual volume VVOL (SP123). Furthermore, the CPU 30 updates the copy pair management table 45 (FIG. 11) in the local management apparatus accordingly (SP124) and notifies all the storage apparatuses 4 constituting the virtual storage apparatus VST of the update content of the copy pair management table 45 (SP125). Thus, each storage apparatus 4 which has received this notice updates the copy pair management table 45 in the local storage apparatus in accordance with the content of that notice.

Then, the CPU 30 terminates this third copy pair setting processing and returns to the copy pair setting processing.

(3-2-7) Fourth Copy Pair Setting Processing

Figure 31:
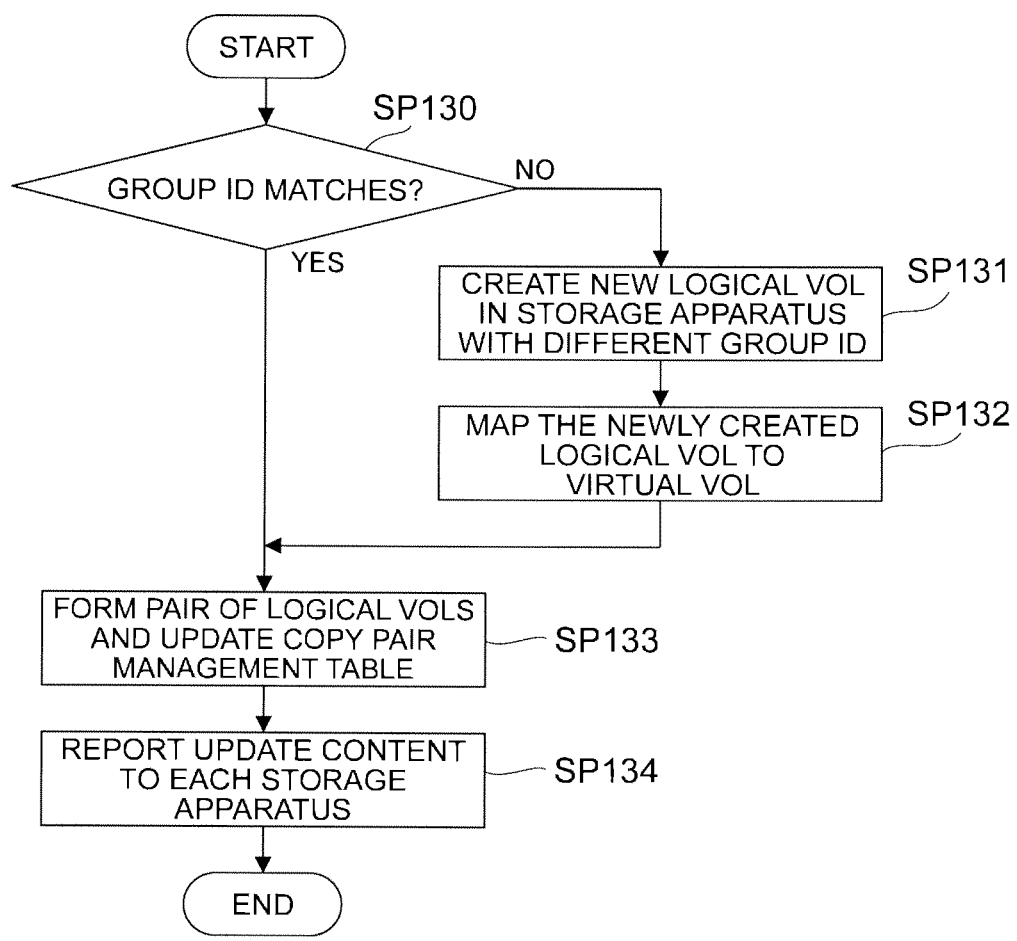
FIG. 31 is a flowchart illustrating a processing sequence for fourth copy pair setting processing.

FIG. 31 shows a specific processing sequence for the fourth copy pair setting processing executed by the CPU 30 in step SP88 of the copy pair setting processing (FIG. 26).

When the CPU 30 proceeds to step SP30 of the copy pair setting processing, it starts the fourth copy pair setting processing shown in this FIG. 31; and the CPU 30 firstly refers to the virtual volume management table 40 (FIG. 6) and judges whether the storage apparatus 4, in which the primary logical volume VOL mapped to the primary virtual volume VVOL is created, and the storage apparatus 4, in which the secondary logical volume VOL mapped to the secondary virtual volume VVOL is created, regarding which the pair instruction was received on the copy pair setting screen 80 (FIG. 24), belong to the same storage group or not (SP120). Then, if the CPU 30 obtains an affirmative judgment result in this step, it proceeds to step SP133.

On the other hand, if the CPU 30 obtains a negative judgment result in step SP130, it refers to the virtual volume management table 40 and creates a primary logical volume VOL and/or secondary logical volume VOL with the designated capacity in storage apparatuses 4 belonging to different storage groups (SP131). Specifically speaking, the CPU 30 newly creates another secondary logical volume VOL or primary logical volume VOL in a storage apparatus 4, whose used amount does not exceed the capacity threshold and in which a logical volume VOL with the designated capacity can be created, from among storage apparatuses 4 belonging to a storage group different from that of the storage apparatus 4, in which the primary logical volume VOL or the secondary logical volume VOL is created, or newly creates both a primary logical volume VOL and a secondary logical volume VOL in storage apparatuses 4 which belong to respectively different storage groups, whose used amount does not exceed the capacity threshold, and in which two logical volumes VOLs with the designated capacity can be created.

Subsequently, the CPU 30 maps the primary logical volume VOL and/or the secondary logical volume VOL, which were created in step SP131, to the corresponding primary virtual volume VVOL or secondary virtual volume VVOL (SP132). Furthermore, the CPU 30 updates the copy pair management table 45 (FIG. 11) in the local management apparatus accordingly (SP133) and notifies all the storage apparatuses 4 constituting the virtual storage apparatus VST of the update content of the copy pair management table 45 (SP134). Thus, each storage apparatus 4 which has received this notice updates the copy pair management table 45 in the local storage apparatus in accordance with the content of that notice.

Then, the CPU 30 terminates this fourth copy pair setting processing and returns to the copy pair setting processing.

(3-3) I/O Command Reception Processing

Figure 32:
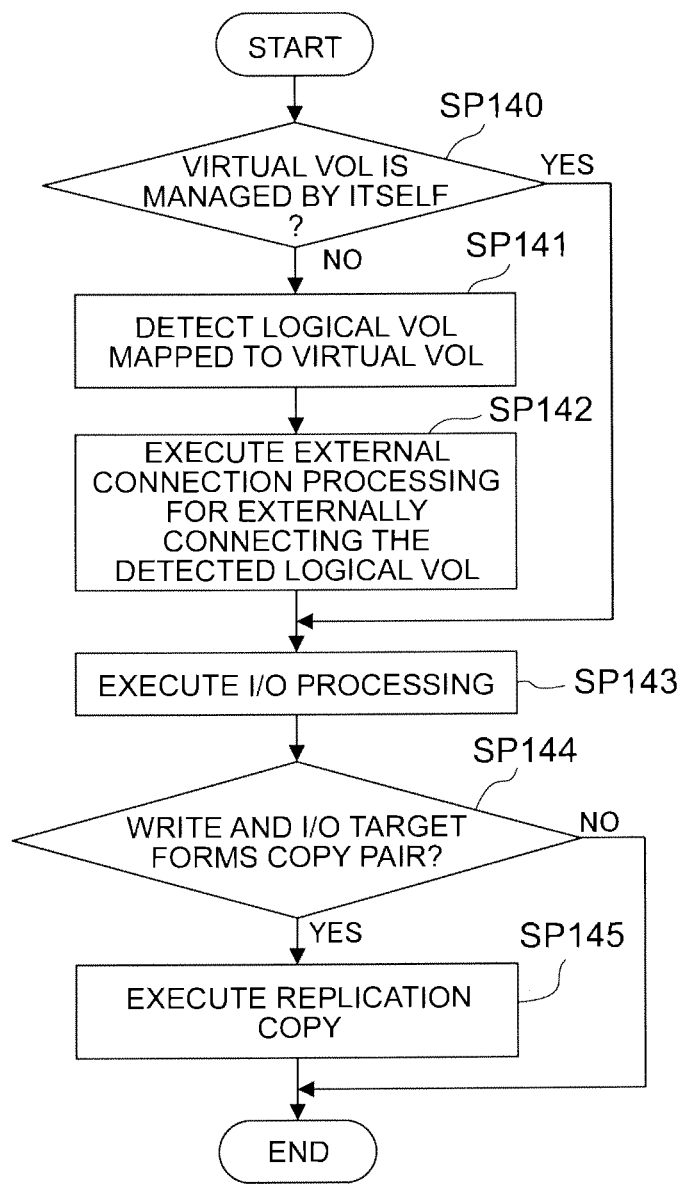
FIG. 32 is a flowchart illustrating a processing sequence for I/O command reception processing.

FIG. 32 shows a specific processing sequence for I/O command reception processing executed by the CPU 21A, 21B for a storage apparatus 4 when an I/O command is given from the host system 3 to that storage apparatus 4 after the copy pair is created as described above.

When the front-end interface unit 20A, 20B for the storage apparatus 4 receives the I/O command issued from the relevant host system 3, the front-end interface unit 20A, 20B notifies the CPU 21A, 21B to that effect.

Then, after receiving the notice, the CPU 21A, 21B starts the I/O command reception processing shown in FIG. 32 and firstly refers to the virtual volume management table 40 (FIG. 6) and judges whether or not a logical volume VOL associated with a virtual volume VVOL which is designated as a data read/write target in the I/O command (hereinafter referred to as the target virtual volume) is a logical volume VOL for which the local storage apparatus should take charge of the I/O processing (SP140). This judgment is made by judging whether or not the logical volume VOL associated with the target virtual volume VVOL is registered in the logical volume management table 43 (FIG. 9) retained by the local storage apparatus. Then, if the CPU 30 obtains an affirmative judgment result in step SP140, it proceeds to step SP143.

On the other hand, if the CPU 21A, 21B obtains a negative judgment result in step SP140, it refers to the virtual volume management table 40 and detects the volume ID of the logical volume VOL associated with the target virtual volume VVOL and the apparatus ID of the storage apparatus 4 in which the relevant logical volume VOL is created (SP141).

Then, the CPU 21A, 21B externally connects the logical volume VOL detected in step SP141 and additionally registers necessary information about that logical volume VOL in the logical volume management table 43 (FIG. 9) in order to make it a dummy logical volume VOL in the local storage apparatus (SP142).

Subsequently, the CPU 21A, 21B executes the I/O processing, which is designated by the I/O command, on the logical volume VOL, as a target, which is associated with the target virtual volume VVOL (SP143).

Next, the CPU 21A, 21B judges, based on the virtual volume management table 40 and the copy pair management table 45, whether or not the I/O command is a write command and the virtual volume VVOL which is the target of the I/O processing forms a copy pair with another virtual volume VVOL (SP144). Then, if the CPU 30 obtains a negative judgment result in this step, it terminates this I/O command reception processing.

On the other hand, if the CPU 21A, 21B obtains an affirmative judgment result in step SP144, it refers to the copy pair management table 45 and executes replication copying between the logical volume VOL (the primary logical volume VOL) which is mapped to the I/O processing target virtual volume VVOL and the logical volume VOL (the secondary logical volume VOL) which is set as a copy pair with the above-mentioned logical volume VOL.

Specifically speaking, if the primary logical volume VOL and the secondary logical volume VOL are created in the same storage apparatus 4, the CPU 21A, 21B writes data, which has been written to the primary logical volume VOL, directly to the secondary logical volume VOL. Furthermore, if the primary logical volume VOL and the secondary logical volume VOL are not created in the same storage apparatus 4, the CPU 21A, 21B transfers the data, which has been written to the primary logical volume VOL at that time, together with the write command, which designates the secondary logical volume VOL as the write location, to the storage apparatus 4 in which the secondary logical volume VOL is provided. As a result, this data is written to the secondary logical volume VOL in the storage apparatus 4 which is the data transfer destination.

Then, when the replication copying is completed, the CPU 30 terminates this I/O command reception processing.

(4) Advantageous Effects of this Embodiment

When the computer system 1 according to this embodiment as described above is used, for example, if a copy pair for remote copying is defined between a primary virtual volume VVOL and a secondary virtual volume VVOL, and even if a logical volume (primary logical volume) VOL mapped to the primary virtual volume VVOL and a logical volume (secondary logical volume) VOL mapped to the secondary virtual volume VVOL are created in the same storage apparatus 4 at the beginning, at least one of the primary logical volume VOL and the secondary logical volume VOL is switched to a logical volume VOL in a different storage apparatus 4.

Specifically speaking, if the location relationship between the primary logical volume VOL and the secondary logical volume VOL is not appropriate in this computer system 1, at least one of the primary logical volume VOL and the secondary logical volume VOL is switched to an appropriate logical volume VOL. So, the system administrator can create a copy pair with the fault tolerance intended by the system administrator without recognizing the location relationship between the primary logical volume VOL and the secondary logical volume VOL. As a result, the system management can be simplified and the computer system capable of creating a copy pair having the fault tolerance intended by the user can be realized.

(5) Other Embodiments

Incidentally, the aforementioned embodiment has described the case where the present invention is applied to the computer system configured as illustrated in the attached drawings; however, the present invention is not limited to this example and can be applied to a wide variety of computer systems having various other configurations.

Furthermore, the aforementioned embodiment has described the case where the first grouping policy to group the storage apparatuses 4 based on the product information such as a vendor name and a type name, the second grouping policy to group the storage apparatuses 4 based on the access information retained by each storage apparatus 4 about access from the host system 3, the third grouping policy to group the storage apparatuses 4 based on the network information retained by network equipment constituting the first network 5 for connecting the host system 3 and the storage apparatuses 4, and the fourth grouping policy for the system administrator to manually group the storage apparatuses are provided as the grouping policies. However, the present invention is not limited to this example and a wide variety of other grouping policies can be applied.

Furthermore, the aforementioned embodiment has described the case where the storage apparatus grouping unit for grouping each of the storage apparatuses 4 constituting a virtual storage apparatus VST into a plurality of storage groups according to the designated grouping policy and assigning a group ID specific to a storage group, to which the relevant storage apparatus belongs, to each storage apparatus 4 and the copy pair setting unit used, when setting a copy pair, to switch a part or whole of each of logical volumes, which are associated respectively with virtual volumes designated as a copy source and a copy destination of the copy pair, to an appropriate logical volume as necessary based on the group ID assigned to each storage apparatus and according to the designated copy pair setting policy are constituted from the CPU 30 for the management apparatus 7 and the control programs stored in the memory 31 for the management apparatus 7. However, the present invention is not limited to this example and a wide variety of other configurations can be applied.

Furthermore, the aforementioned embodiment has described the case where a first location relationship in which the respective logical volumes associated with the respective virtual volumes to constitute a copy pair exist in the same storage apparatus, a second location relationship in which the respective logical volumes exist in different storage apparatuses belonging to the same storage group, a third location relationship in which the respective logical volumes exist in storage apparatuses belonging to different storage groups, and a fourth location relationship in which a plurality of secondary virtual volumes VVOLs are provided and the respective logical volumes VOLs exist in different storage apparatuses 4 belonging to different storage groups are specified on the copy pair setting screen 23 as the location relationship between the primary logical volume VOL associated with the primary virtual volume VVOL and the secondary logical volume VOL associated with the secondary virtual volume VVOL. However, the present invention is not limited to this example and only part of the first to fourth location relationships may be specified or a location relationship other than the first to the fourth location relationships may be specified.

Furthermore, the aforementioned embodiment has described the case where the grouping policy selection screen 50 is constructed as shown in FIG. 14 and the copy pair setting screen 80 is constructed as shown in FIG. 24. However, the present invention is not limited to this example and a wide variety of other structures can be applied as the structures of the grouping policy selection screen 50 and the copy pair setting screen 80.

INDUSTRIAL APPLICABILITY

The present invention can be applied to a wide variety of computer systems for providing logical volumes, which are created respectively in a plurality of storage apparatuses, as virtual volumes in one virtual storage apparatus to a host system.

REFERENCE SIGNS LIST

1 Computer system
2 Site
3 Host system
4 Storage apparatus
5, 6 Networks
7 Management apparatus
10 Storage devices
11A, 11B Controllers
21A, 21B, 30 CPUs
31 Memory
40 Virtual volume management table
41 Logical device management table
42 Pool management table
43 Logical volume management table
44 Storage apparatus usage management table
45 Copy pair management table
46 Storage apparatus management table
47 Group ID reverse lookup table
50 Grouping policy selection screen
60 Grouping result display screen
70 Group ID change screen
80 Copy pair setting screen, copy pair manual setting screen
LDEV Logical device
RG RAID group
VOL Logical volume
VST Virtual storage apparatus
VVOL Virtual volume

The invention claimed is:

1. A management apparatus for managing a computer system including a plurality of storage apparatuses disposed in a plurality of sites, for virtually providing a virtual storage apparatus to a host system over the plurality of storage apparatuses, each of the plurality of storage apparatuses having a logical volume as a virtual volume of the virtual storage apparatus, the management apparatus comprising:

a storage apparatus grouping unit configured to group the respective storage apparatuses constituting the virtual storage apparatus into a plurality of storage groups in accordance with a designated grouping policy such that storage apparatuses disposed at an identical subnetwork are grouped as an identical storage group, and assign, to each of the plurality of storage apparatuses, a group ID specific to a storage group, to which a relevant storage apparatus belongs and a copy pair setting unit configured to set a copy pair, for switching a part or whole of each of logical volumes, which are associated with the respective virtual volumes designated as a copy source virtual volume and a copy destination virtual volume of the copy pair, to an appropriate logical volume as necessary based on the group ID assigned to each storage apparatus and in accordance with a designated copy pair setting policy related to a relationship between the copy source virtual volume and the copy destination virtual volume, wherein the copy pair setting policy includes information on local copy or remote copy of the respective logical volumes associated with the copy source virtual volume and the copy destination virtual volume;

wherein the grouping policy includes at least one of a first grouping policy to group the storage apparatuses based on product information, a second grouping policy to group the storage apparatuses based on access information retained by each storage apparatus about access from the host system, a third grouping policy to group the storage apparatuses based on network information, and a fourth grouping policy to group the storage apparatuses manually;

wherein the storage apparatus grouping unit is configured to:

display a grouping policy selection screen for selecting one grouping policy from selectable grouping policies among the first to fourth grouping policies; and group the storage apparatuses in accordance with the grouping policy selected by using the grouping policy selection screen.

2. A management apparatus for managing a computer system including a plurality of storage apparatuses disposed in a plurality of sites, for virtually providing a virtual storage apparatus to a host system over the plurality of storage apparatuses, each of the plurality of storage apparatuses having a logical volume as a virtual volume of the virtual storage apparatus, the management apparatus comprising:

a storage apparatus grouping unit configured to group the respective storage apparatuses constituting the virtual storage apparatus into a plurality of storage groups in accordance with a designated grouping policy such that storage apparatuses disposed at an identical subnetwork are grouped as an identical storage group, and assign, to each of the plurality of storage apparatuses, a group ID specific to a storage group, to which a relevant storage apparatus belongs; and a copy pair setting unit configured to set a copy pair, for switching a part or whole of each of logical volumes, which are associated with the respective virtual volumes designated as a copy source virtual volume and a copy destination virtual volume of the copy pair, to an appropriate logical volume as necessary based on the group ID assigned to each storage apparatus and in accordance with a designated copy pair setting policy related to a relationship between the copy source virtual volume and the copy destination virtual volume, wherein the copy pair setting policy includes information on local copy or remote copy of the respective logical volumes associated with the copy source virtual volume and the copy destination virtual volume;

wherein the copy air setting policy includes at least a first location relationship in which the respective logical volumes associated with the respective virtual volumes that constitute the copy pair exist in the same storage apparatus, a second location relationship in which the respective logical volumes exist in different storage apparatuses belonging to the same storage group, and a third location relationship in which the respective logical volumes exist in the storage apparatuses belonging to different storage groups;

wherein the copy pair setting unit is configured to:

display a copy pair setting screen for designating the respective virtual volumes which are the copy source virtual volume and the copy destination virtual volume constituting the copy pair, and the copy pair setting policy; and switch a part or whole of each of logical volumes, which are associated with the respective virtual volumes designated as the copy source virtual volume and the copy destination virtual volume of the copy pair on the copy pair setting screen, to an appropriate logical volume as necessary in accordance with the copy pair setting policy designated by using the copy pair setting screen.

3. The management apparatus according to claim 2, wherein the copy pair setting policy further includes designation of a copy type of replication copying to be executed by the copy pair.

4. A management method in a management apparatus for managing a computer system including a plurality of storage apparatuses disposed in a plurality of sites, for virtually providing a virtual storage apparatus to a host system over the plurality of storage apparatuses, each of the plurality of storage apparatuses having a logical volume as a virtual volume of the virtual storage apparatus, the management method comprising:

a step of grouping, by the management apparatus, the respective storage apparatuses constituting the virtual storage apparatus into a plurality of storage groups in accordance with a designated grouping policy such that storage apparatuses in an identical subnetwork are grouped as an identical storage group, and assigning, to each of the plurality of storage apparatuses, a group ID specific to a storage group, to which a relevant storage apparatus belongs; and a step of setting, by a copy pair setting unit of the management apparatus, a copy pair, a and switching a part or whole of each of logical volumes, which are associated with the respective virtual volumes designated as a copy source virtual volume and a copy destination virtual volume of the copy pair, to an appropriate logical volume as necessary based on the group ID assigned to each storage apparatus and in accordance with a designated copy pair setting policy related to a relationship between the copy source virtual volume and the copy destination virtual volume, wherein the copy pair setting policy includes information on local copy or remote copy of the respective logical volumes associated with the copy source virtual volume and the copy destination virtual volume;

wherein the grouping policy includes at least one of a first grouping policy to group the storage apparatuses based on product information, a second grouping policy to group the storage apparatuses based on access information retained by each storage apparatus about access from the host system, a third grouping policy to group the storage apparatuses based on network information, and a fourth grouping policy to group the storage apparatuses manually;

wherein the step of grouping the respective storage apparatuses includes:

displaying a grouping policy selection screen for selecting one grouping policy from selectable grouping policies among the first to fourth grouping policies; and grouping the storage apparatuses in accordance with the grouping policy selected by using the grouping policy selection screen.

5. A management method in a management apparatus for managing a computer system including a plurality of storage apparatuses disposed in a plurality of sites, for virtually providing a virtual storage apparatus to a host system over the plurality of storage apparatuses, each of the plurality of storage apparatuses having a logical volume as a virtual volume of the virtual storage apparatus, the management method comprising:

a step of grouping, by the management apparatus, the respective storage apparatuses constituting the virtual storage apparatus into a plurality of storage groups in accordance with a designated grouping policy such that storage apparatuses in an identical subnetwork are grouped as an identical storage group, and assigning, to each of the plurality of storage apparatuses, a group ID specific to a storage group, to which a relevant storage apparatus belongs; and a step of setting, by a copy pair setting unit of the management apparatus, a copy pair, a and switching a part or whole of each of logical volumes, which are associated with the respective virtual volumes designated as a copy source virtual volume and a copy destination virtual volume of the copy pair, to an appropriate logical volume as necessary based on the group ID assigned to each storage apparatus and in accordance with a designated copy pair setting policy related to a relationship between the copy source virtual volume and the copy destination virtual volume, wherein the copy pair setting policy includes information on local copy or remote copy of the respective logical volumes associated with the copy source virtual volume and the copy destination virtual volume;

wherein the copy pair setting policy includes at least a first location relationship in which the respective logical volumes associated with the respective virtual volumes that constitute the copy pair exist in the same storage apparatus, a second location relationship in which the respective logical volumes exist in different storage apparatuses belonging to the same storage group, and a third location relationship in which the respective to logical volumes exist in the storage apparatuses belonging to different storage groups;

wherein the step of setting the copy pair includes:

displaying, by the management apparatus, a copy pair setting screen for designating the respective virtual volumes which are the copy source virtual volume and the copy destination virtual volume constituting the copy pair, and the copy pair setting policy; and switching, by the management apparatus, a part or whole of each of the logical volumes, which are associated with the copy source virtual volume and the copy destination virtual volume of the copy pair on the copy pair setting screen, to an appropriate logical volume as necessary in accordance with the copy pair setting policy designated by using the copy pair setting screen.

6. The management method according to claim 5, wherein the copy pair setting policy further includes designation of a copy type of replication copying to be executed by the copy pair.

\* \* \* \* \*